United States Patent [19]

Huhn

[11] Patent Number: 5,473,150
[45] Date of Patent: Dec. 5, 1995

[54] BAR CODE READER WITH CLOSED-LOOP SCAN BEAM FOCUSING

[75] Inventor: Richard J. Huhn, Franklin, Wis.

[73] Assignee: Allen-Bradley Company, Inc., Milwaukee, Wis.

[21] Appl. No.: 312,377

[22] Filed: Sep. 26, 1994

[51] Int. Cl.⁶ .................................................. G06K 7/10
[52] U.S. Cl. ........................................... 235/472; 235/467
[58] Field of Search ...................................... 235/467, 472

[56] References Cited

U.S. PATENT DOCUMENTS

| | | | |
|---|---|---|---|
| 4,808,804 | 2/1989 | Krichever et al. | 235/462 |
| 5,122,644 | 1/1992 | Hasegawa | 235/472 |
| 5,124,539 | 6/1992 | Krichever | 235/472 |
| 5,144,122 | 9/1992 | Danley et al. | 250/201.2 |

Primary Examiner—Harold Pitts
Attorney, Agent, or Firm—James G. Morrow; John J. Horn; George A. Montanye

[57] ABSTRACT

A bar code reader including automatic scan beam focusing based upon decoding performance is disclosed herein. The bar code reader includes a focusing lens which is movably supported along the light path of the scanning beam. An electric motor is coupled to the lens support to move the lens relative to the light beam source in response to control signals. The control signals are produced based upon the data error rate for the data produced by the decoding circuit of the reader from the signals produced by the photodetector therein. Based upon the data error rate, the electric motor is controlled to move the lens to focus the light beam and reduce or eliminate the data error.

20 Claims, 14 Drawing Sheets

BAR CODE READER WITH CLOSED-LOOP SCAN BEAM FOCUSING

BACKGROUND OF THE INVENTION

The present invention relates to focusing the scanning light beam of a bar code reader. In particular, the present invention relates to automatically focusing the scanning light beam based upon the ability of the bar code reader to properly decode the electric signal produced by the reader's photodetector.

Typically, bar code reader manufacturers configure bar code readers to read bar codes positioned within a fixed range of distances from the reader. The fixed range of distances is normally set by the manufacturer based upon the bar code size and range of distances selected by the customer. The main problem with this type of system for setting reading distance ranges is the customers inability to utilize the reader for applications requiring a reading distance or code size outside of the range originally selected.

To avoid some of the problems caused by bar code readers having fixed reading distance ranges and fixed bar code size ranges, some modern bar code readers have also been manufactured with automatic focusing based upon distance sensors. These readers determine the actual distance between the reader and the code, and focus the scanning light beam based upon the distance. One drawback with this type of automatic focusing system is the additional cost of the distance detection circuitry and sensors. Another drawback with the system is that the system controls the distance between the focusing lens and the light beam source based upon the distance between the reader and the code rather than the decoding performance of the reader.

Accordingly, it would be desirable to provide a bar code reader with automatic focusing based upon the decoding performance of the reader or other parameter which optimizes the ability of the reader to provide optimal bar code reading for a wide range of reading distances.

SUMMARY OF THE INVENTION

The present invention provides an optical code reader including automatic focusing based upon the data error rate which occurs during code reading. One configuration of the reader includes a light beam source, a lens, an assembly configured to movably support the lens in the path of the light beam and move the lens in response to movement control signals to produce a focused light beam, a scanner configured to cyclically scan the focused light beam over the surface of a code, and a photodetector configured to produce electrical signals representative of a portion of the focused light beam reflected from the code. A decoding circuit is coupled to the photodetector to convert the electrical signals into digital data, determine the presence of data errors in the digital data, and produce an error signal in the presence of data errors. Based upon the error signal, a control circuit applies movement control signals to the assembly which moves the lens in response to the control signals.

Another configuration of the reader includes a light beam source, a focusing lens, a guide which guides the lens in and along the path of the light beam, an electric motor operatively coupled to the lens support to move the lens along the path in response to movement control signals to produce a focused light beam, a photodetector which produces electrical signals representative of the light reflected thereon, and a pair of oscillating mirrors located in the path to cyclically scan the focused light beam over a two-dimension area within which the code may reside, and direct a portion of the focused light beam reflected from the code to the photodetector. A decoding circuit is coupled to the photodetector to convert the electrical signals into digital data, determine the presence of data errors in the digital data, and produce an error signal in the presence of data errors. Based upon the error signal, a control circuit applies movement control signals to the electric motor to move the lens in response to the control signals.

Still another configuration of the reader includes light means for producing a light beam, a lens, movement means for movably supporting the lens in the path of the light beam and moving the lens in response to movement control signals to produce a focused light beam, means for cyclically scanning the focused light beam over the surface of a code, and means for producing electrical signals representative of a portion of the focused light beam reflected from the code. The reader also includes means for converting the electrical signals into digital data, determining the presence of data errors in the digital data, and applying movement control signals to the movement means based upon the number of data errors.

DETAILED DESCRIPTION OF THE PREFERRED EMBODIMENT

Figure 1:
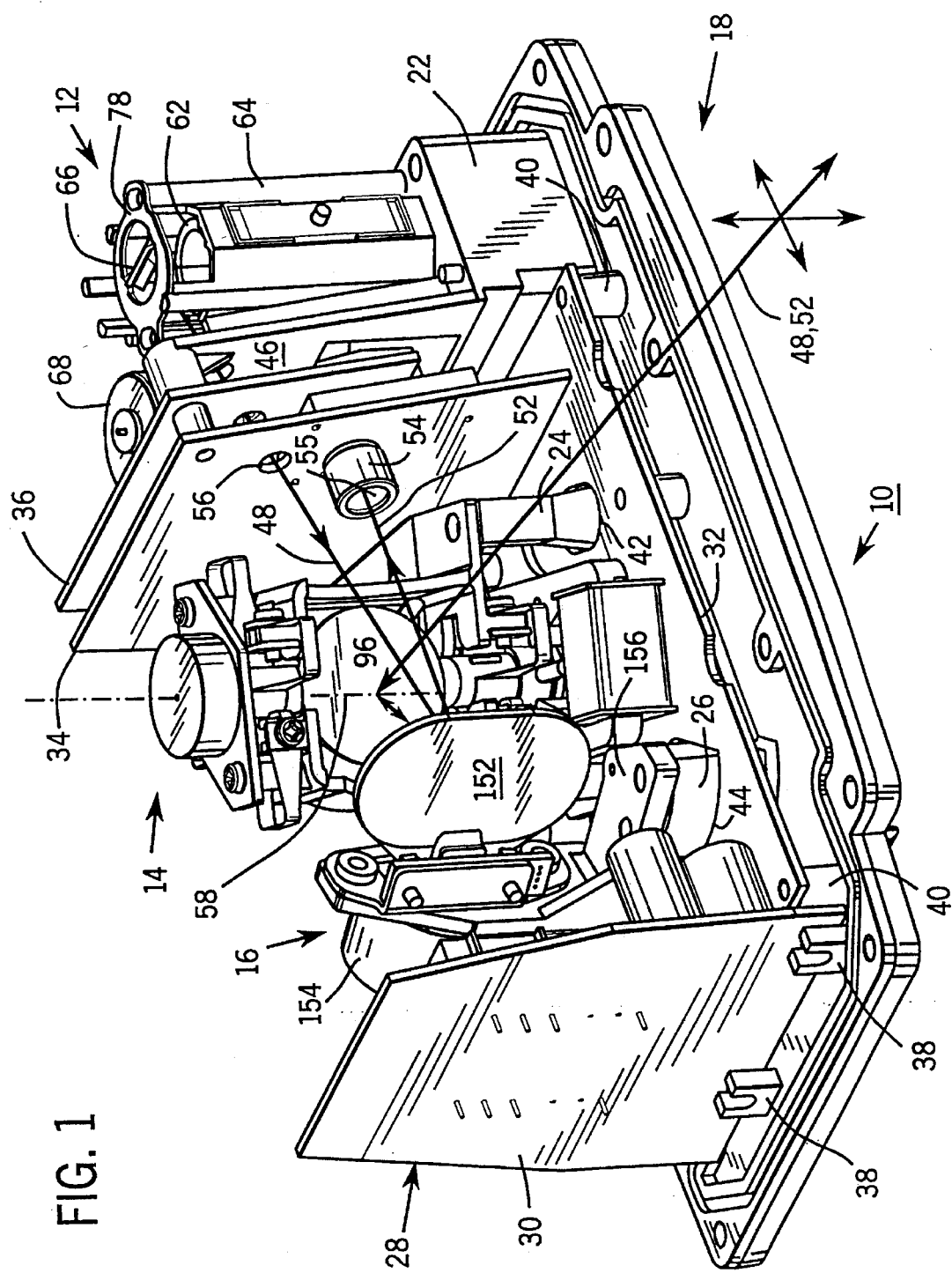
FIG. 1 is a left perspective view of a bar code reader.

Referring to FIG. 1, a bar code reader 10 includes a light beam focusing assembly 12, a scan mirror assembly 14, a pre-raster mirror assembly 16, and a support structure 18. Support structure 18 includes a first pedestal 22 which supports focusing assembly 12, a set of pedestals 24 upon which scan mirror assembly 14 is mounted, and a second pedestal 26 upon which pre-raster mirror assembly 16 is mounted. By way of example, support structure 18 may be fabricated from materials (e.g. aluminum) such as metals or plastics which are sufficiently rigid and dimensionally stable to maintain the relative locations of assemblies 12, 14 and 16 when reader 10 is subjected to external forces or changes in temperature.

Bar code reader 10 also includes a mounting assembly 28 having a first circuit board 30, a horizontal shield 32, a second circuit board 34, and a third circuit board 36. Board 30 is supported by a pair of slotted tabs 38, formed integrally with structure 18, to which shield 30 is fastened with rivets or screws (not shown). Horizontal board 32 is fastened (e.g. screwed or riveted) to a set of pedestals 40 which are fastened to support 18 so that board 32 is spaced from support 18. Horizontal board 32 includes openings 42 and 44 through which pedestals 24 and 26 extend to support assemblies 14 and 16, respectively. Vertical boards 34 and 36 are fastened together and supported by a tower 46 extending upwardly from pedestal 22 and by a second support 47 (FIG. 2) attached to structure 18. Mounting assembly 28 provides physical support for the circuitry of reader 10. Additionally, assembly 28 may serve as separation and/or electromagnetic shielding.

Figure 14A:
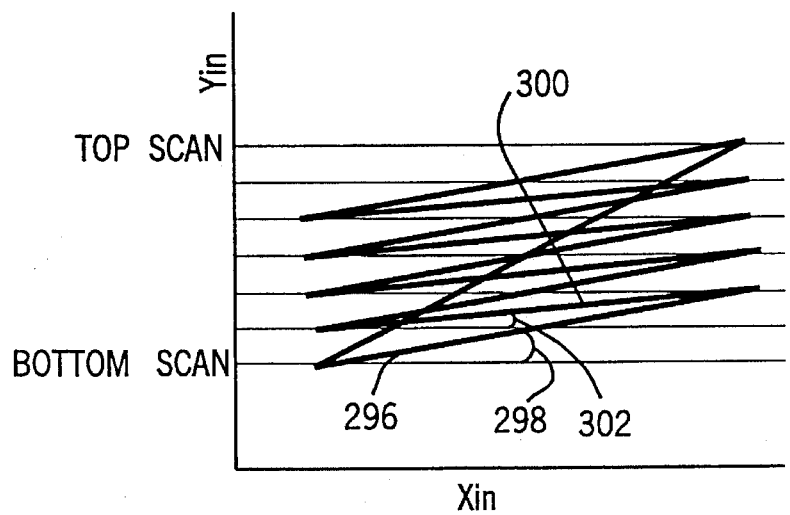
FIG. 14A is a graphical representation of a raster scan pattern.

Turning now to the general operation of reader 10, light beam focusing assembly 12, scan mirror assembly 14, and pre-raster mirror assembly 16 are mounted and oriented upon structure 18 to focus and direct a light beam 48 produced by a light source such as a visible laser diode 50 (FIG. 4) toward a light reflecting code such as a bar code (not shown), and direct return light 52 to a transducer such as a photodetector 54. More specifically, diode 50 produces a light beam 48 which is focused by assembly 12 which directs light beam 48 through openings 56 and 57 (FIG. 4) in shield 34 and 36, respectively, to pre-raster mirror assembly 16. Pre-raster mirror assembly 16 directs beam 48 to assembly 14 while simultaneously oscillating the beam along a vertical line 58 (i.e. scanning the beam along vertical lines). Assembly 14 directs beam 48 to the bar code while simultaneously oscillating the beam in a horizontal plane (i.e. scanning or sweeping the beam along horizontal lines to produce horizontal scan lines). Assemblies 14 and 16 can operate independently as line scanners. However, angular assembly 16 oscillates at selectable rotational velocities (frequencies) substantially lower than the oscillating frequency of assembly 14 to scan a two dimension area. For line scanning applications, assembly 16 does not oscillate. Accordingly, the combination of assemblies 12, 14 and 16 scan a focused light beam 48 across bar codes within the two-dimension area in a raster scan pattern with a horizontal scan frequency dependent upon the frequency at which assembly 14 operates and a vertical scan velocity dependent upon the angular velocity at which assembly 16 operates. FIG. 14A illustrates an example of such a raster scan pattern.

Assemblies 14 and 16 also direct the portion of beam 48 reflected off of the bar code back to photodetector 54. In particular, the reflected light 52 is diffuse and is gathered by assembly 14 which reflects the light to assembly 16, which in turn focuses and reflects a portion of the return light 52 back to photodetector 54. The structure and control circuitry of bar code reader 10 will now be discussed in detail in reference to the FIGURES. (For purposes of simplifying the drawings, return light 52 is represented by a line which represents the general reflective paths of the light 52.)

Referring to FIGS. 1–4, light beam focusing assembly 12 includes a lens 60, a movable cylindrical lens support 62, a lens support guide 64, a mirror 66, a stepping motor 68, and a lens support translator 70. Lens support 62 is guided by support guide 64 through the sliding interaction of the exterior cylindrical surface 74 of support 62 and the interior cylindrical surface 76 of guide 64. More specifically, the interaction of surfaces 74 and 76 provide a linear bearing for allowing translation of support 62 along axis 72. By way of example, guide 64 is formed integrally with first pedestal 22 to rigidly support guide 64 relative to support structure 18. Lens support guide 64 also supports mirror 66. In particular, a mirror support frame 78 is fastened (e.g. screwed or riveted) over the top opening of guide 64 so lens 60 remains centered upon the vertical axis 72 of beam 48 when lens support 62 translates within guide 64. Mirror 66 is fastened to frame 78 so that its orientation directs light beam 48 from diode 50 through openings 56 and 57 to pre-raster mirror assembly 16.

Stepping motor 68 and lens support translator 70 are fastened to a support frame 80 which is supported relative to support structure 18 by first pedestal 22. By way of example, lens support translator 70 is a worm drive including a worm gear mounted upon the shaft of stepping motor 68 and a drive gear (not shown) operatively engaged with the worm gear to rotate an output shaft 82 either clockwise or counterclockwise. The outboard end of shaft 82 includes a cam 84 which interacts with lens support 62. In particular, support 62 includes an opening 86 which forms a cam seat (FIG. 4) within which cam 84 is located. Upon rotation of cam 84, through the operation of motor 68, the surface of cam 84 interacts with the interior surface of opening 86 to translate lens support 62 within support guide 64 along axis 72. To maintain contact between the surface of cam 84 and the interior surface of opening 86, a spring (not shown) may be appropriately connected between support 62 and guide 64 to bias support 62 in one direction along axis 72.

The above-described structure of light beam focusing assembly 12 controllably and selectively focuses the light beam produced by diode 50 when the direction and angle of rotation of stepping motor 68 is controlled. Rotation of motor 68 translates lens 60 along axis 72 relative to diode 50. As an alternative, diode 50 could be moved relative to lens 60 supported in a fixed position. The control of stepping motor 68 is described in detail below in combination with the control circuit of bar code reader 10.

Depending upon the configuration of laser diode 50, it may be desirable to provide cooling within pedestal 22 to cool diode 50. Thus, in the present embodiment, a peltier cooling device 47 and heat sink 49 are fastened within chamber 23 of pedestal 22 below diode 50. Device 47 is a conventional semiconductor device powered by the power supply of reader 10 via appropriate circuitry.

Referring to FIGS. 5–8, scan mirror assembly 14 includes a frame 88, a mirror carrier (support) 90, a first spring assembly 92, a second spring assembly 94, a mirror (reflector) 96, an oscillator (motor) assembly 98, a first damper 100, a second damper 102 having substantially the same shape and size as damper 100, and a transducer (magnetic pick-up) 104. Mirror carrier 90 includes a mirror carrier shaft 106 fabricated from an elongated rod material (e.g. plastic) having a generally circular cross-section. Shaft 106 defines a longitudinal axis which runs along the center of the shaft and is coincident with a reference rotational axis 108 fixed in space relative to frame 88 when shaft 106 is not oscillating. A first end shaft portion 110 having a circular cross-section and a central longitudinal axis is fastened to the top end of shaft 106 so that the longitudinal axis of portion 110 is coincident with rotational axis 108.

The bottom end of shaft 106 includes a magnet carrier 112 and a second end shaft portion 114. Magnet carrier 112 is attached to the bottom end of shaft 106 and configured as shown to attach a permanent bar magnet 116 and shaft portion 114 to the bottom of shaft 106. In particular, carrier 112 connects shaft portion 114 at the bottom of shaft 106 so the central longitudinal axis of shaft 114 is coincident with rotational axis 108 when shaft 106 is not oscillating or is oscillating in an ideal manner. Bar magnet 116 is a permanent magnet having north and south poles of opposite polarity and a central axis 118. Carrier 112 fixes magnet 116 at the bottom of shaft 106 so the longitudinal axis of shaft 106 passes through the center of magnet 116, and intersects and is perpendicular to central axis 118. Thus, when shaft 106 is not oscillating or oscillating in an ideal manner, axis 118 intersects axis 108, axis 118 is perpendicular to axis 108, and axis 108 passes through the midpoint of magnet 116 between the north and south poles.

Mirror carrier shaft 106 also includes a mirror mount 120 to which mirror 96 is fastened (e.g. glued). Mirror mount 120 is fabricated by appropriately machining or molding shaft 106 generally at its center to produce a generally flat surface to which mirror 96 is fastened. Mirror mount 120 is machined so that the reflective surface of mirror 96 is substantially parallel with rotational axis 108, and depending upon the application, fabricated so that rotational axis 108 is in close proximity to the reflective surface of mirror 96 (e.g. within a distance less than the diameter of shaft 106). By mounting mirror 96 so that the reflective surface thereof is in close proximity to the rotational axis 108, the operation of scan mirror assembly 14 will oscillate beam 48 to produce an appropriate horizontal scan (sweep). Thus, the closely proximate distance between the reflective surface of mirror 96 and rotational axis 108 may vary and be selected, depending upon the application, to produce an appropriate range and configuration for the scanning motion of light beam 48.

First and second spring assemblies 92 and 94 resiliently support mirror carrier 90 relative to frame 88. When mirror carrier 90 is stationary (i.e., no oscillation), the longitudinal axis of mirror carrier shaft 106 and rotational axis 108 are exactly coincident and remain fixed relative to frame 88. Spring assemblies 92 and 94 are configured to resiliently support mirror carrier 90 relative to frame 88 so that the longitudinal axes of shaft 106 and end shaft portions 110 and 114 remain substantially coincident with reference rotational axis 108 without the assistance of bearings when mirror carrier 90 is oscillated by oscillator assembly 98. Assemblies 92 and 94 also support carrier 90 so that a small magnet mounted behind mirror 96 on carrier 90 is in magnetic communication with magnetic pickup 104.

Spring assemblies 92 and 94 are substantially identical, and each includes four substantially identical folded beams 122. The specific configuration of beams 122 may have a U-shape of the configuration shown in the FIGURES. Beams 122 of spring assembly 92 are evenly spaced and fastened to the top end of shaft 106 between mirror 96 and end shaft portion 110, and beams 122 of spring assembly 94 are evenly spaced and fastened to the bottom end of shaft 106 between mirror 96 and magnet carrier 112. In the preferred embodiment, shaft 106 is fabricated from a plastic material where beams 122 are molded, glued and/or captured in the respective ends of shaft 106. More specifically, beams 122 of assembly 92 are attached to shaft 106 in alignment directly above corresponding beam 122 of assembly 94 as shown in FIGS. 5–8. This configuration promotes coincidence between the longitudinal axis of shaft 106 and axis 108 during oscillation of shaft 106. The opposite ends of beams 122 are fastened (e.g. screwed or riveted) to appropriately configured formations 123 of frame 88 such as those illustrated in FIGS. 5–8.

The multi-segment configuration of folded beams 122 permit the elimination of bearings for supporting mirror carrier 90, and the problems associated therewith, while providing a structure which permits appropriate oscillation of carrier 90 about reference rotational axis 108 as discussed above. The specific multi-segment configuration of each beam 122 includes a first tapered beam 124 connected to a constant width beam 126 which is connected to a second tapered beam 128. (For purposes of clarifying the FIGURES, all of the specific elements of beam 122 are only labeled on one beam 122 in FIG. 6.) The widest end of each tapered beam 124 is fastened to frame 88, and the widest end of each tapered beam 128 is fastened to mirror carrier shaft 106. Furthermore, beams 124 and 128 are substantially parallel, and beam 126 is substantially perpendicular to beams 124 and 128. To facilitate fabrication, the thickness of folded beams 126 are constant. The present configuration of folded beams 122 provides relatively long life before fatigue failure, and produces desired rotational stiffness. This configuration also maintains separation between orthogonal and pitch modes to provide acceptable oscillation of mirror carrier 90 about reference rotational axis 108, i.e. the longitudinal axis of shaft 106 and axis 108 remain substantially coincident during oscillation.

The preferred embodiments of first and second spring assemblies 92 and 94 each include four folded beams 122 having constant thicknesses. However, it is contemplated that the thickness of beams 122 could be fabricated to produce appropriate spring characteristics, and that three folded beams 122 could be used in place of four folded beams under appropriate circumstances.

Figure 9:
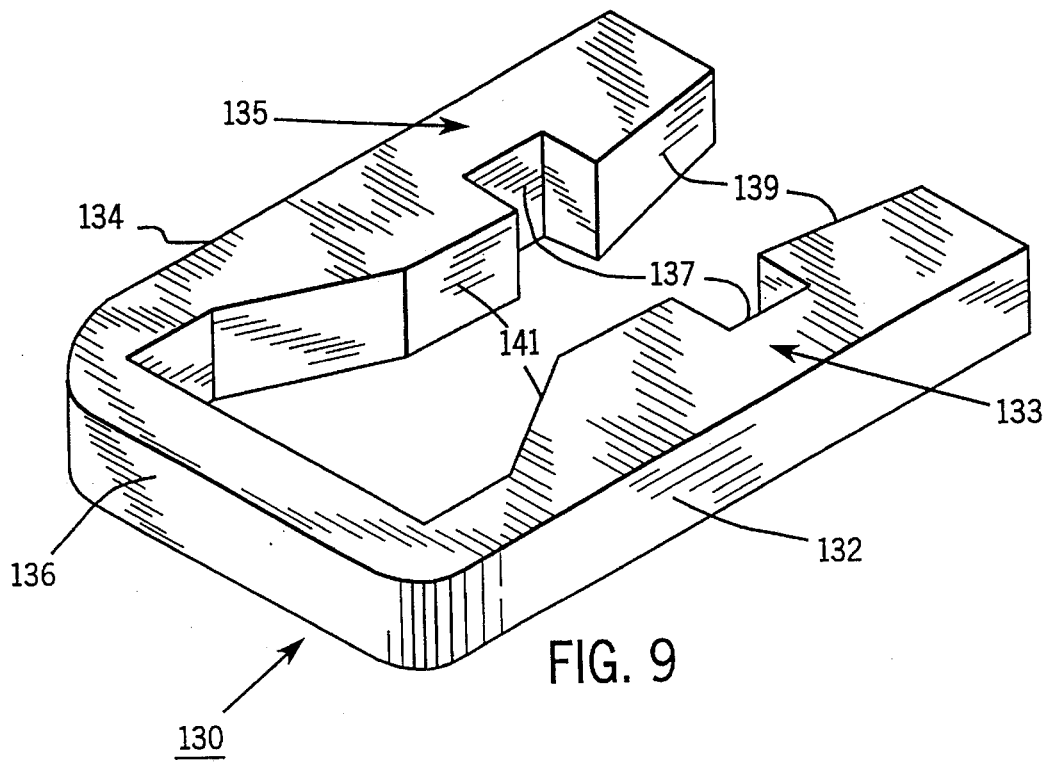
FIG. 9 is a perspective view of an electromagnet core.

Oscillator assembly 98 includes a generally U-shaped core 130 having a first leg 132, a second leg 134, a winding mount 136, and a winding 138 (electromagnet). Referring to FIG. 9, first and second legs 132 and 134 are substantially parallel and connected to winding mount 136 so that mount 136 is substantially perpendicular to legs 132 and 134 to form a U-shape. By way of example, U-shaped core 130 may be fabricated from laminated iron. Leg 132 provides a first pole location 133 and leg 134 provides a second pole location 135 configured as shown in FIG. 9. More specifically, each of pole locations 133 and 135 include detents 137 and angled surfaces 139 and 141. This configuration of core 130 permits positioning core 130 so pole locations 133 and 135 are in close proximity to, and in magnetic communication (magnetically coupled) with, magnet 116, and prevents interference between carrier 112, magnet 116 and locations 133 and 135. More generally, the configuration of core 130 allows the majority of the electric energy supplied to winding 138 to produce oscillatory motion of carrier 90 about rotational axis 108, and provides wider deflection angles for mirror 96 at higher frequencies.

Winding 138 is disposed about winding mount 136 so that location 133 has a polarity opposite from location 135 when winding 138 is energized via leads 140 and 142 with a particular polarity current. Thus, when an alternating current is applied to winding 138, the polarity of location 133 alternates between north and south, while the polarity of location 135 is opposite to the polarity of location 133.

As generally discussed above, core 130 is fastened to frame 88 so that bar magnet 116 is located between pole locations 133 and 135. Preferably, central axis 118 of bar magnet 116 is parallel to legs 132 and 134, and perpendicular to winding mount 136 when mirror carrier 94 is stationary (i.e., not oscillating). By mounting core 130 relative to magnet 116 in this manner, mirror carrier 90 and associated mirror 96 are oscillated when an alternating current is applied to winding 138. Depending upon the desired scanning frequency (i.e., oscillation frequency of mirror 96), which is typically between 300 and 800 scans per second, the masses of mirror carrier 90, mirror 96 and magnet 116, spring beam 122 configuration, and frequency of the current applied to winding 138, are selected so that one of the resonant frequencies of oscillation corresponds to the desired scanning frequency. By appropriately selecting these factors, the amount of electrical energy required to energize winding 138 with an alternating current which produces the desired scanning frequency can be minimized.

Figure 5:
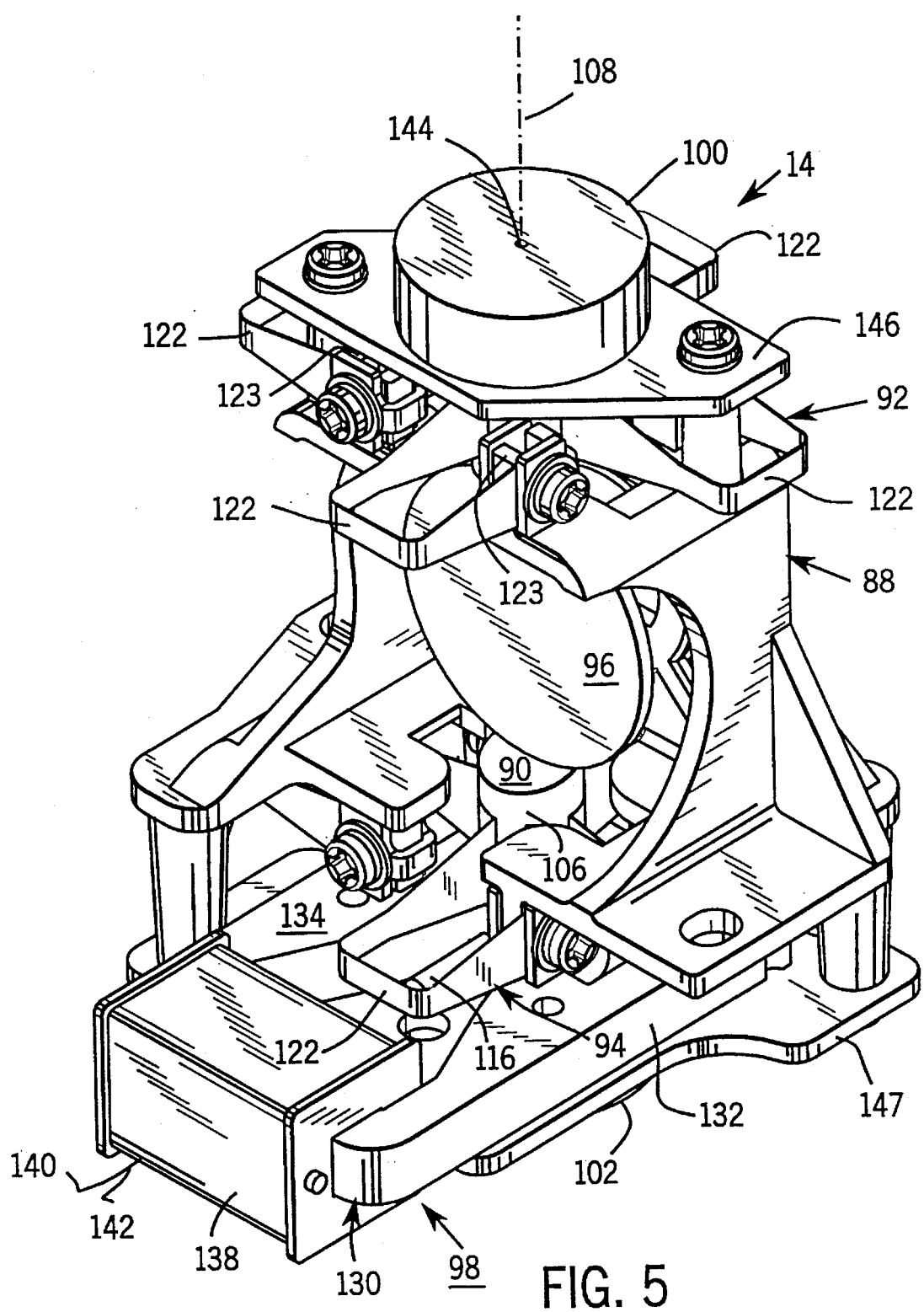
FIG. 5 is a top left perspective view of a scan mirror assembly.
Figure 6:
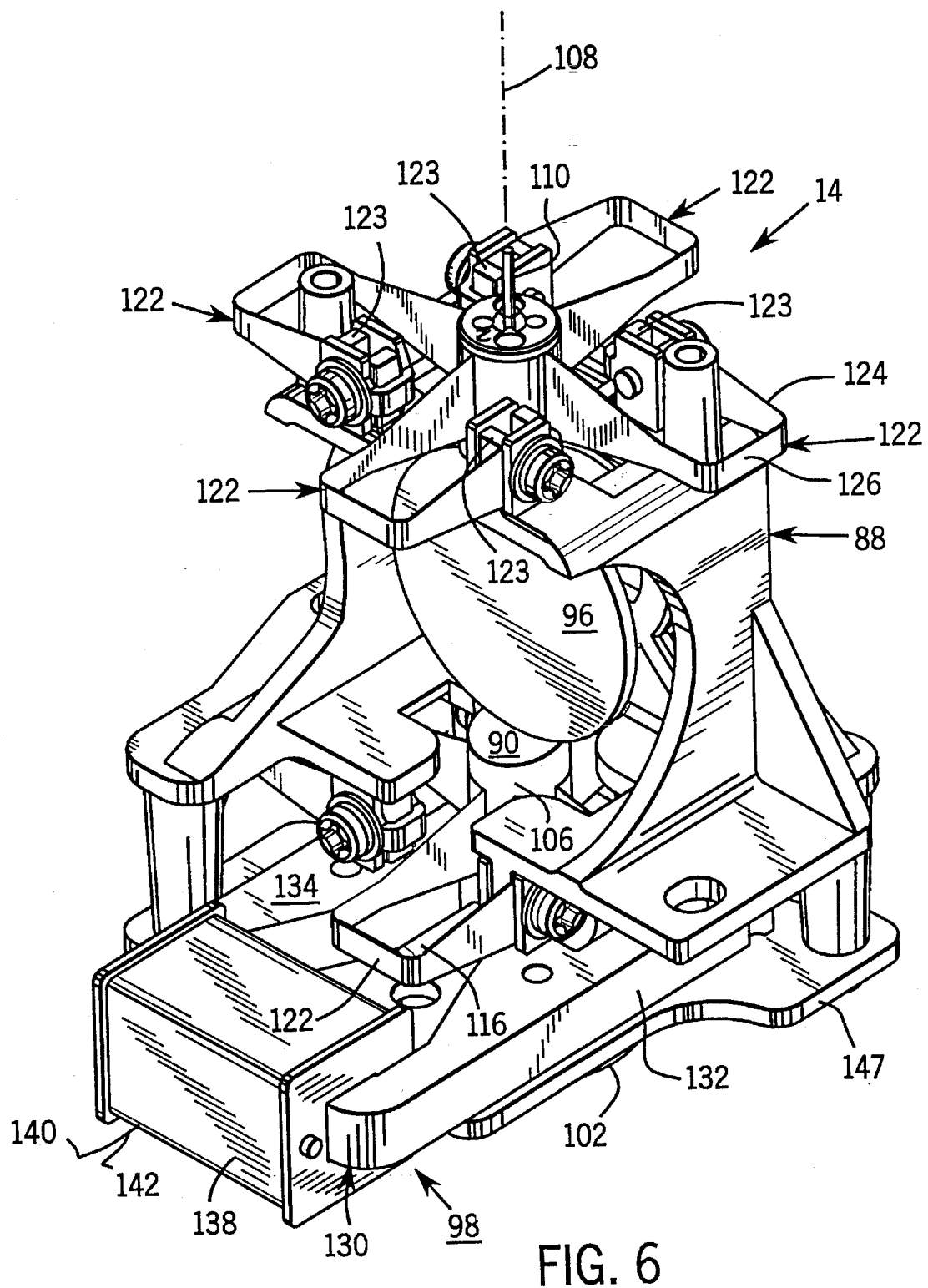
FIG. 6 is a top left perspective view of the scan mirror assembly with the upper damper assembly removed.
Figure 7:
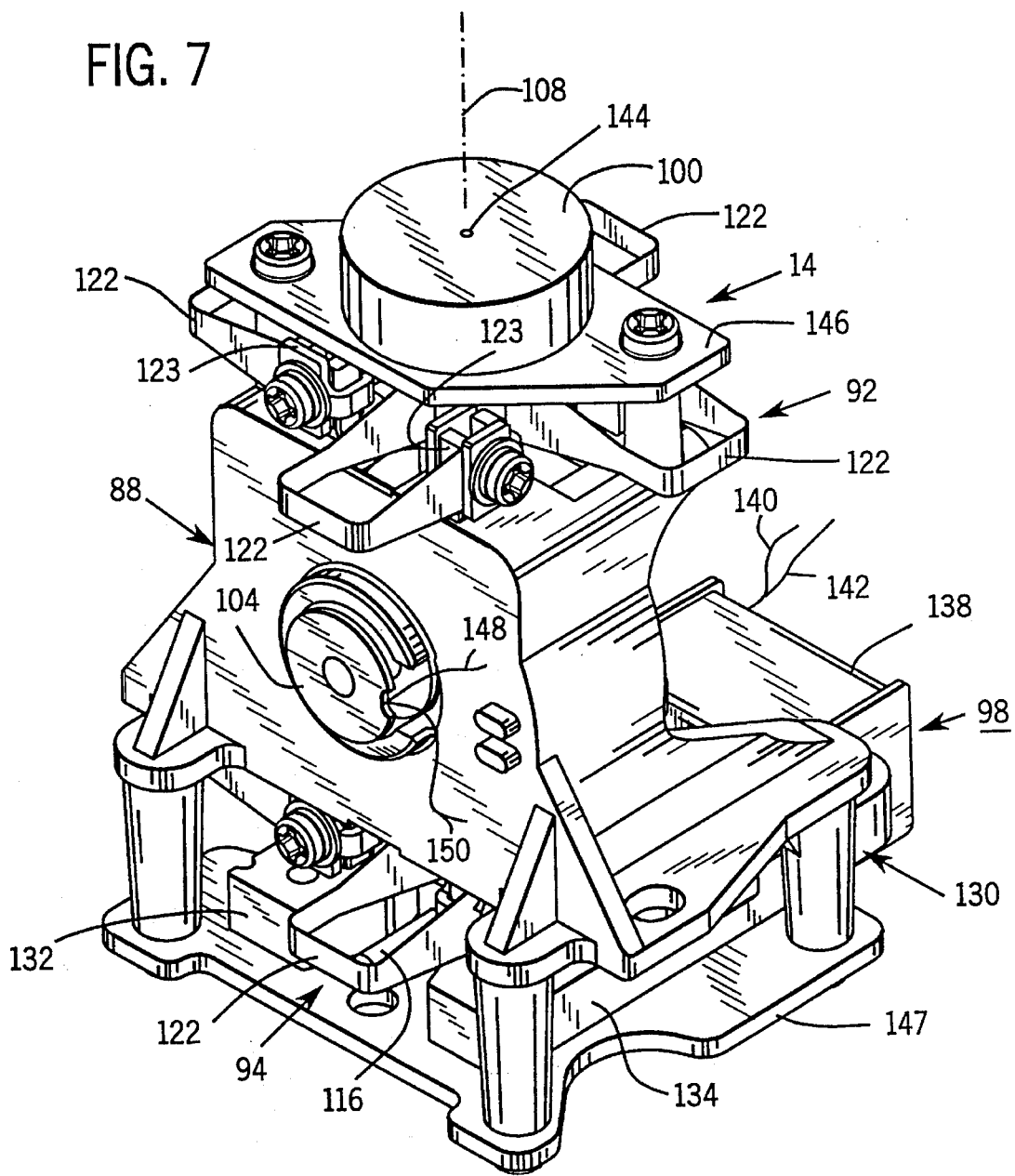
FIG. 7 is a right perspective view of the scan mirror assembly.
Figure 8:
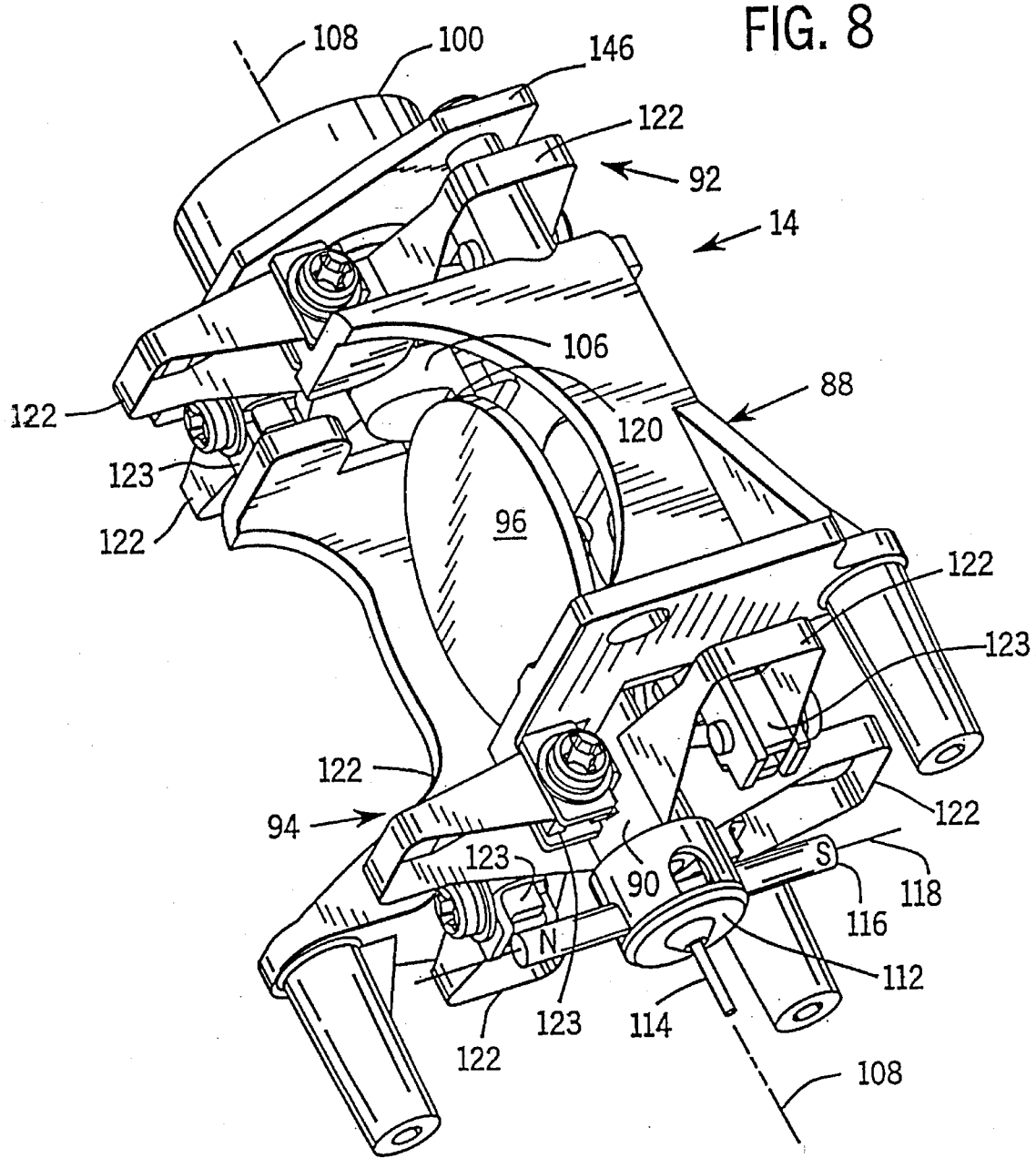
FIG. 8 is a bottom left perspective view of the scan mirror assembly with the lower damper assembly and oscillator core removed.

Referring to FIGS. 5, 7 and 8, dampers 100 and 102 are configured as cylindrical disks having an opening 144 slightly larger than the diameter of the associated shaft portions 110 and 114. By appropriately sizing openings 144, frictional losses between dampers 100 and 102 and associated portions 110 and 114 can be minimized without reducing the lateral damping capability of dampers 100 and 102. Lateral dampening absorbs the energy of forces which cause mirror carrier 90 to oscillate so the longitudinal axis of shaft 106 is not coincident with reference rotational axis 108 during oscillation. Typically, such forces are external to bar code reader 10 (e.g. jarring of a product transfer line upon which reader 10 is mounted).

Damper 100 is fastened (glued) to a support plate 146 fastened (screwed) to the top of frame 88 so that portion 110 and opening 144 of damper 100 are substantially concentric when shaft 106 is stationary. Damper 102 is also fastened (glued) to a support 147 fastened to the bottom of frame 88 so that shaft 114 and the opening in damper 102 are substantially concentric. By way of example, dampers 100 and 102 can be fabricated from a resilient, non-metallic material such as foam. More specifically, the foam may be a closed-cell type foam such as a urethane. Alternatively, a resilient, woven, non-metallic material may be used in place of the foam.

Referring to FIG. 7, magnetic pick-up 104 is fastened to the back of frame 88 in relatively close proximity to a permanent magnet (not shown) located on mirror carrier shaft 106 behind mirror 96. The purpose of pick-up 104 is to produce a feedback signal representative of the rotational velocity of shaft 106 and mirror 96 during oscillation. More specifically, when shaft 106 is oscillating about its longitudinal axis, and the magnet is alternating directions near pick-up 104, an oscillating signal is produced on leads 148 and 150 which represents the angular velocity of shaft 106 and mirror 96. From this signal, the maximum positive angle of rotation (clockwise rotation limit during oscillation) and maximum negative angle of rotation (counter-clockwise rotation limit during oscillation) is determined. The signal produced on leads 148 and 150 is representative of the frequency at which mirror 96 oscillates. In particular, the amplitude of the signal increases as the frequency increases.

Figure 2:
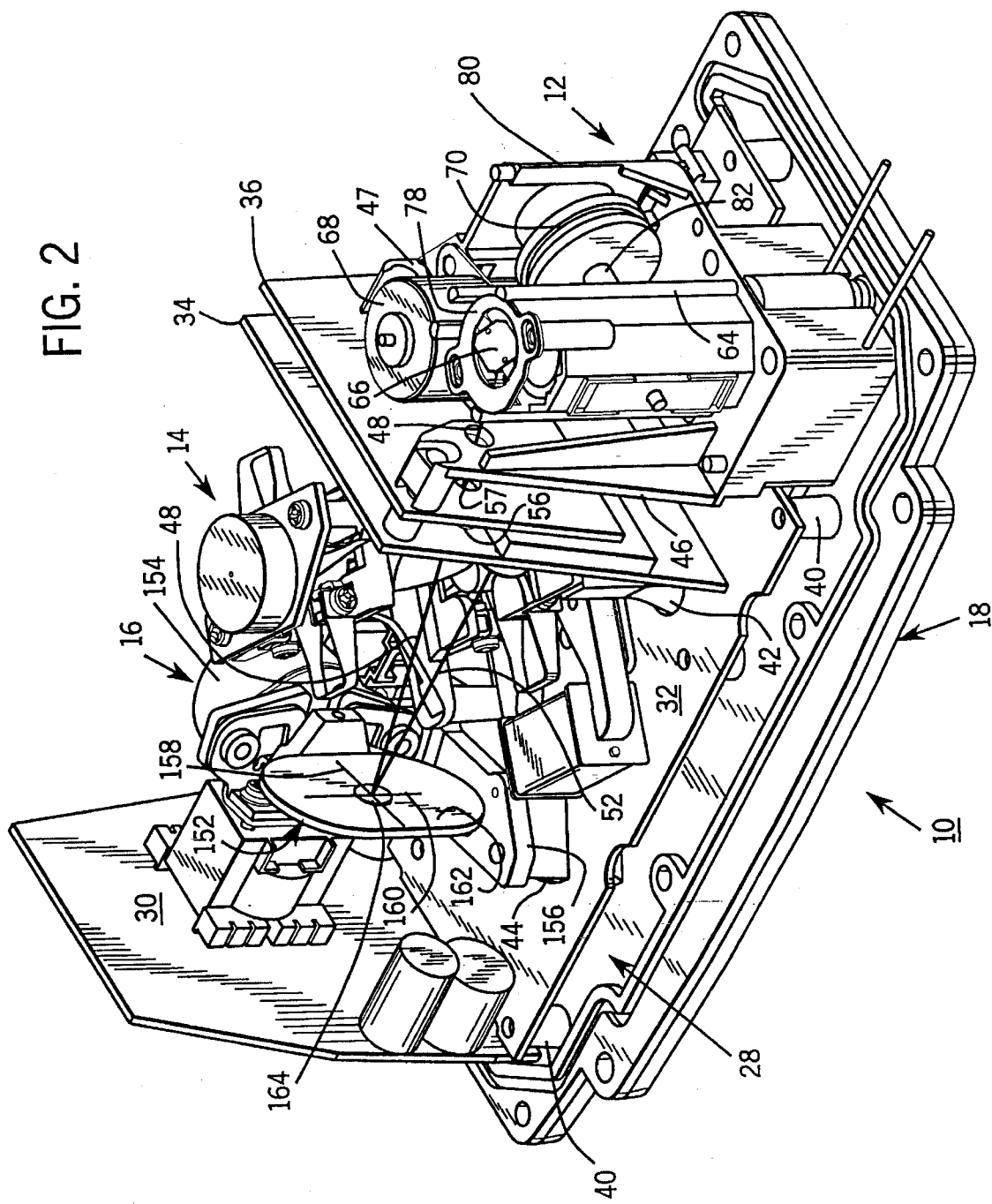
FIG. 2 is a right perspective view of the bar code reader.
Figure 3:
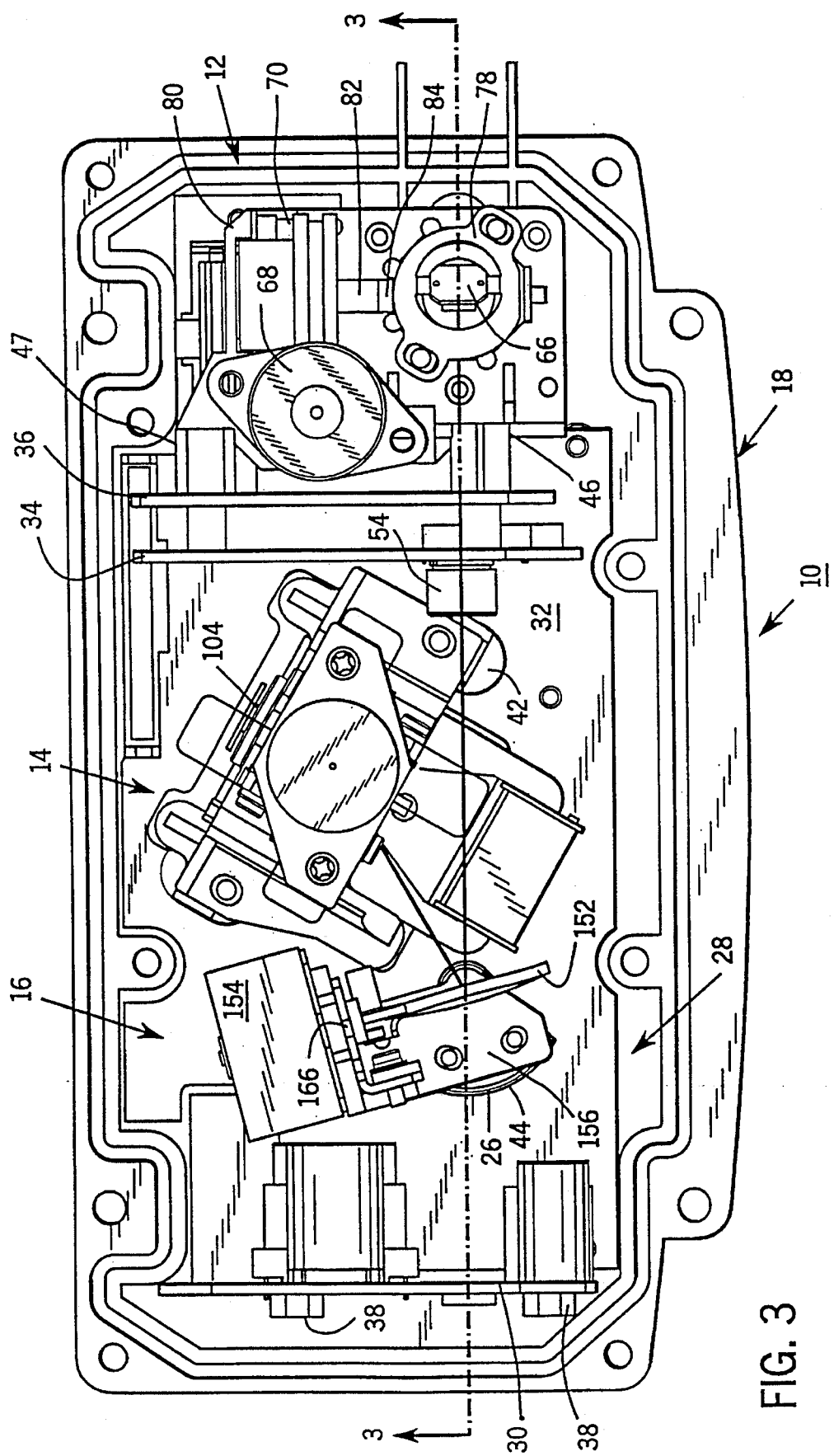
FIG. 3 is a top plan view of the bar code reader.
Figure 4:
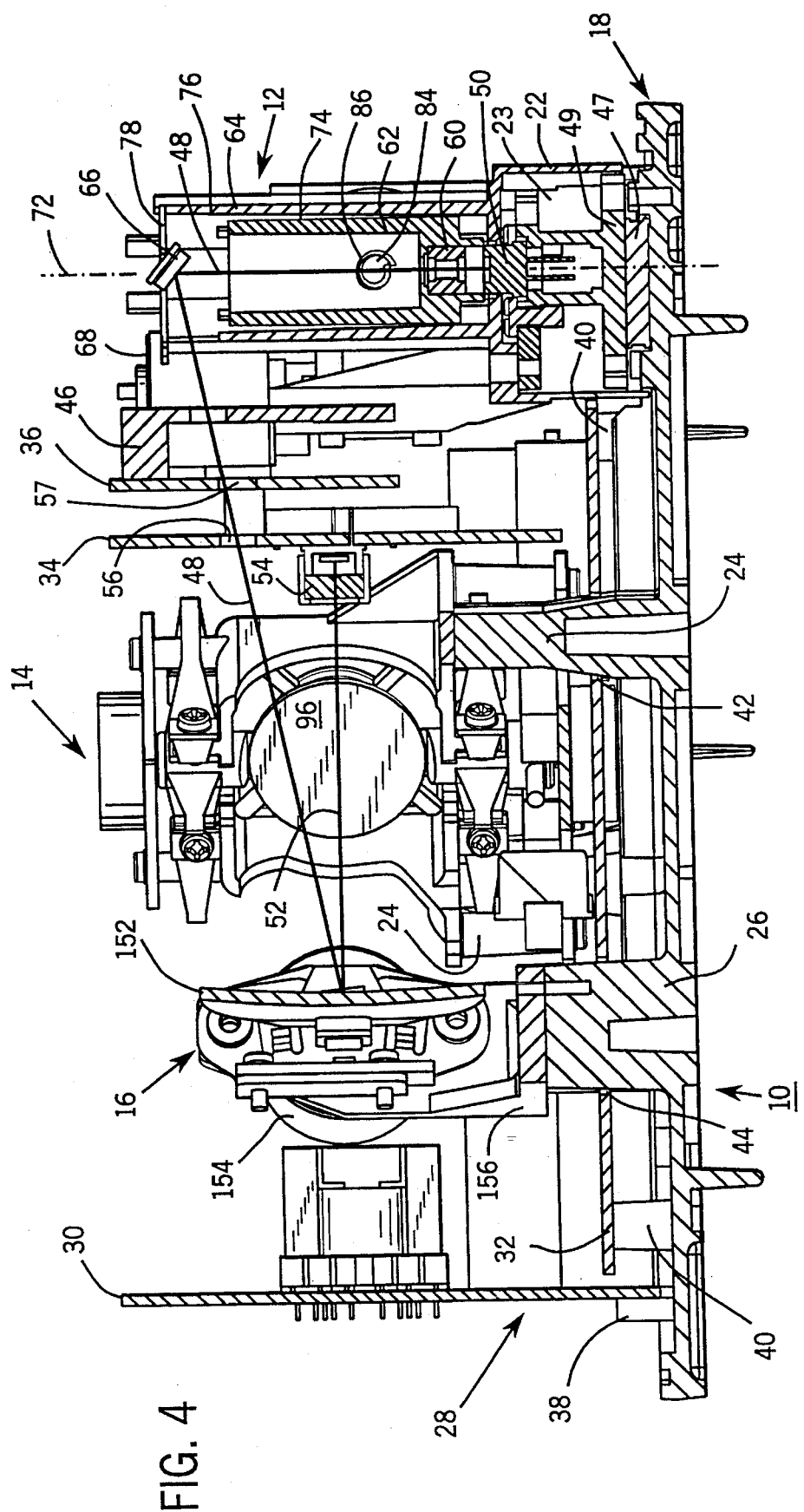
FIG. 4 is a sectional view taken along line 3—3 in FIG. 3.

Referring again to FIGS. 1–4, pre-raster mirror assembly 16 includes a compound mirror 152, a motor (i.e. selectable and variable frequency oscillator or rotator) 154, and an angle frame 156. Mirror 152 includes a horizontal axis 158 and a vertical axis 160. Mirror 152 also includes two contiguous, reflective surfaces 162 and 164, respectively. More specifically, the first reflective surface 162 circumscribes reflective surface 164, and is configured to direct and focus light reflected from the bar code and mirror 96 to photodetector 54. In the preferred embodiment, reflective surface 162 is a concave surface having a spherical radius of about 4.72 inches. Surface 164 is preferably a flat surface oriented relative to surface 162 so that it is substantially parallel with axis 158 and substantially perpendicular to light beam 48 when mirror 152 is vertical (FIGS. 2 and 4).

The use of surface 164 which is an optically flat mirror separate from, and circumscribed by, surface 162 provides a surface for light transmission. Surface 162 collects reflected light from the scanned bar code and focuses this light upon photodetector 54. This configuration reduces or eliminates the need for a collector lens at photodetector 54, and minimizes the cost and complexity of the daylight (ambient) filter 55 at photodetector 54.

The use of a compound mirror also permits fabricating mirror 152 from molded plastic having a reflective coating. Additionally, use of a compound mirror reduces the cost of mirror 152 by limiting the need for a high quality reflective surface (e.g. flat within ¼ of a wavelength) to surface 164.

Compound mirror 152 is mounted upon the shaft 166 of motor 154 so that axis 158 and the longitudinal axis of shaft 166 are substantially parallel and axis 158 is in close proximity to the axis of shaft 166. By maintaining a closely proximate distance between axis 158 and the longitudinal axis of shaft 166, a satisfactory relationship between the angular location of shaft 166 and the height of the raster pattern can be maintained. Motor 154 is fastened to angle frame 156 by appropriate fasteners. Frame 156 is fastened to pedestal 26 so that mirrors 96 and 152 cooperate during oscillation to produce a raster scan pattern having the desired height, width and location. Additionally, frame 156 is positioned so mirror 152 is directly in front of photodetector 54. This minimizes the cost of filter 55 by directing light rays to filter 55 which are substantially perpendicular thereto. The configuration of assembly 16 also permits the generation of raster sweep angles in the range of 30 degrees.

Figure 10:
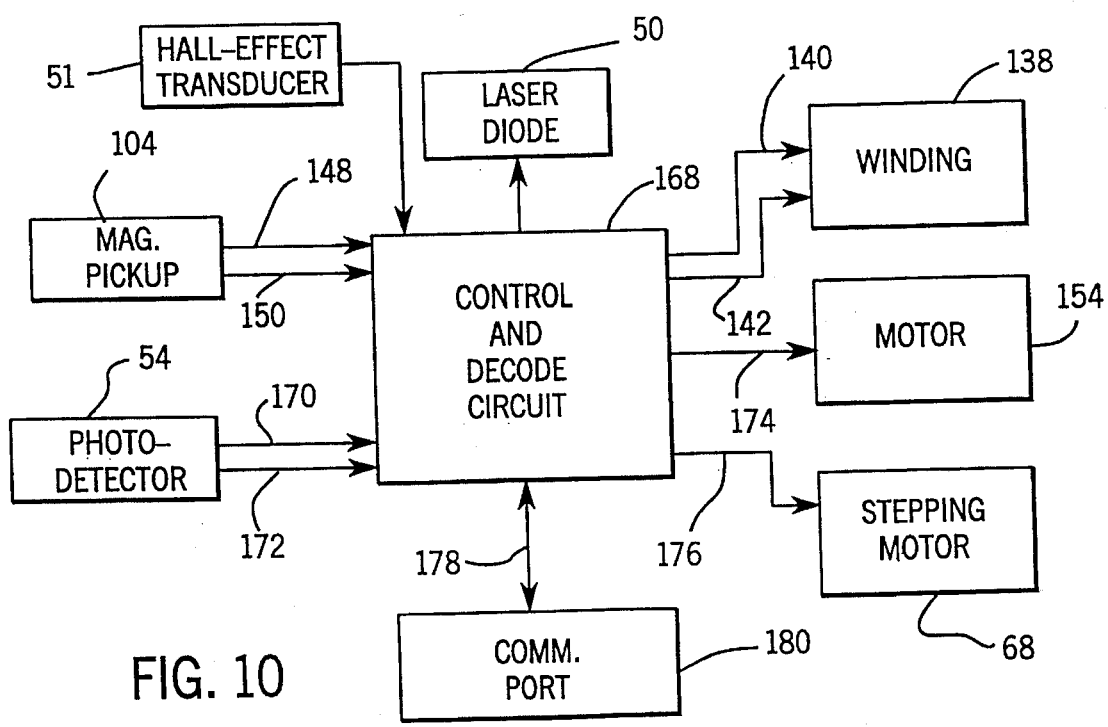
FIG. 10 is a schematic block diagram of the bar code reader circuitry.

Referring to FIG. 10, the control circuitry of bar code reader 10 includes a control and decode circuit 168 coupled to magnetic pick-up 104 by leads 148 and 150, photodetector 54 by conductors 170 and 172, winding 138 by conductors 140 and 142, motor 154 by conductor 174, and stepping motor 68 by databus 176. Depending upon the particular environment within which reader 10 is used, a databus 178 will connect circuit 168 to an appropriate communications port 180 (e.g. RS 232, RS 485, discrete input/output solid state relays). The specific configuration of bar code reader circuits for controlling the energization of laser diodes such as laser diode 50 and decoding the signals produced by photodetectors 54 are generally known and will not be described in detail herein. Depending upon the application for which reader 10 is used, various configuration wave shaping and decoding circuits can be used. For example, the operation of such control circuitry is disclosed in numerous reference such as *The Bar Code Book*, 2d ed., Helmer's Publishing, Inc., (1991).

Figure 11:
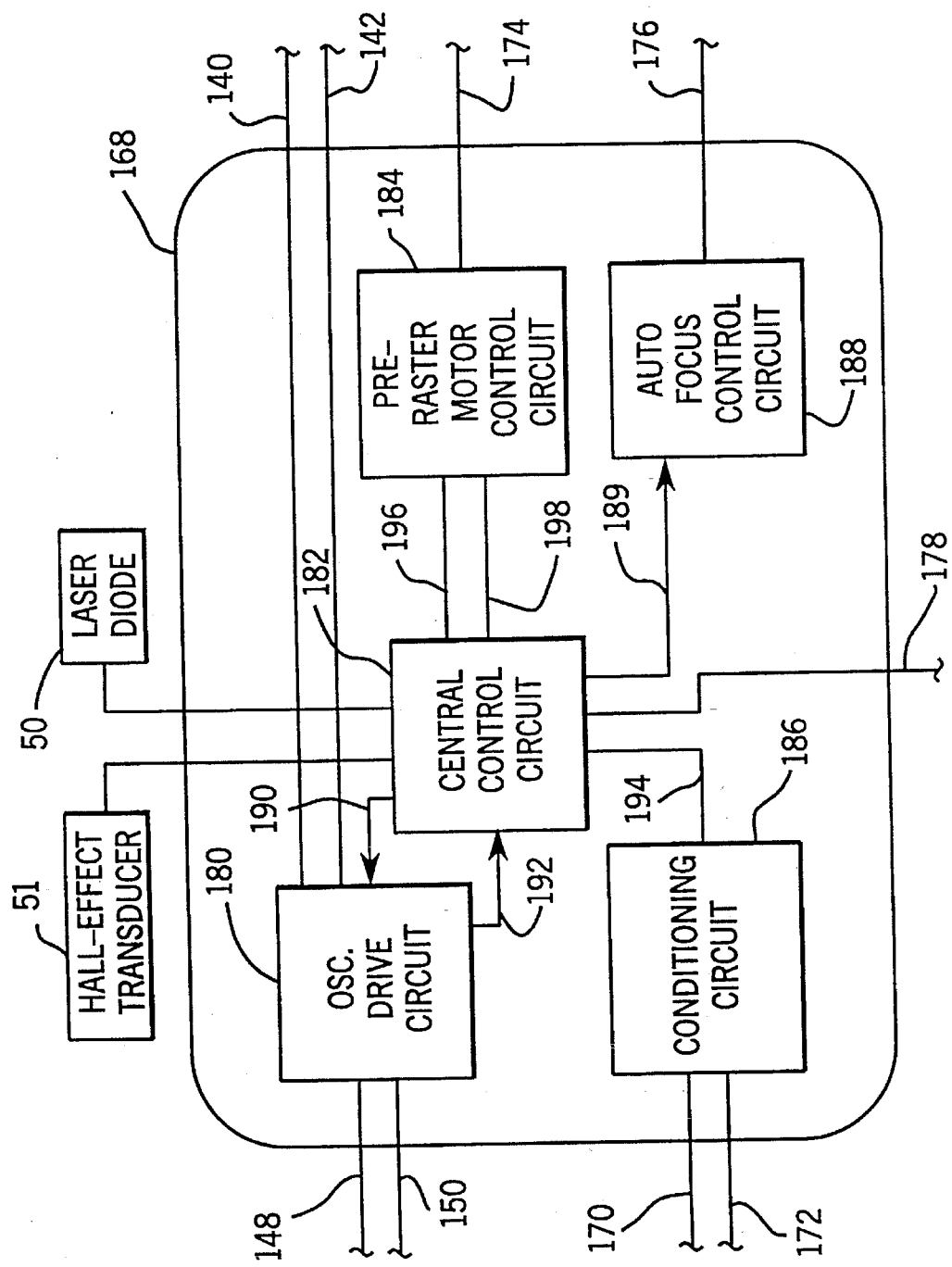
FIG. 11 is a schematic block diagram of the bar code reader control and decode circuit.

The present embodiment of reader 10 uses unique motor 154 control signals, winding 138 energization signals, and stepping motor 68 control signals as described in reference to FIG. 11. In general, control and decode circuit 168 is configured to energize winding 138 to initiate oscillation of mirror 96 of scan mirror assembly 14, and sustain oscillation of mirror 96 at a predetermined resonant frequency and angle of rotation, as described in detail below. Circuit 168 also controls motor 154 of pre-raster mirror assembly 16 to control the raster pattern generated by light beam 48 so that the angle at which light beam 48 is scanned over a bar code can be varied based upon the validity of the data obtained when the signal from photodetector 54 is decoded. Additionally, motor 154 is controlled by circuit 168 to raster light beam 48 in one direction at a relatively slow rate for reading in that direction (e.g. from bottom to top) and returned almost instantaneously from the top to the bottom. This type of raster control improves the ability of reader 10 to read bar codes which pass through either the extreme top or bottom of the raster scan pattern or reader 10. Stepping motor 68 is controlled by circuit 168 to control the focusing of the light beam produced by laser diode 50. Motor 68 is controlled based upon the validity of the data produced when the signal generated by photodetector 54 is decoded.

Referring to FIG. 11, control and decode circuit 168 includes an oscillator drive circuit 180, a central control circuit 182, a pre-raster motor control circuit 184, a conditioning circuit 186, and an auto focus control circuit 188. Central control circuit 182, which in the present embodiment is a programmable digital processor (e.g., MC 68340 manufactured by Motorola, Inc.) coupled to a digital-to-analog converter 262 (FIG. 12A), applies an oscillation angle control signal to circuit 180 via conductor 190. In the present embodiment, circuit 182 is coupled to digital-to-analog converter 262 (FIG. 12A) to produce an oscillation angle control signal in the form of a DC signal related to (e.g. proportional to) the desired angle of oscillation for mirror 96.

Circuit 180 applies a position signal to circuit 182 via conductor 192. By way of example, the position signal is a square wave wherein the leading edges of the square wave represent that mirror 96 is positioned either at its maximum or minimum angle of rotation about the longitudinal axis of mirror carrier shaft 106. Based upon the oscillation angle control signal and the signal produced by magnetic pickup 104 and applied to drive circuit 180 via conductors 148 and 150, circuit 180 energizes winding 138 with a voltage substantially equal to the system supply voltage for a duration (i.e. pulse width) based upon the difference between the desired angle of oscillation for mirror 96 and the actual angle of oscillation for mirror 96.

Conditioning circuit 186 is coupled to photodetector 54 by conductors 170 and 172. Circuit 186 is a conditioning circuit which converts the signal produced by photodetector 54 into a digital pulse train having an amplitude of approximately 5V. This signal is applied to central control circuit 182 via conductor 194. Circuit 182 decodes the pulse train to generate data representative of the bar code scanned to produce the square wave. Subsequently, circuit 182 may transmit data representative of the information to communications port 180 via databus 178. The digital processor of circuit 182 is programmed in a conventional manner to decode the pulse train into data representative of the information embodied in the last code scanned to produce the pulse train. The processor is also programmed to determine if the data is valid. Validity can be determined by comparing data to data representative of expected symbols, comparing data from a sequence of two or more scan lines and/or determining if the data satisfies the rules for the bar code symbols expected during reading (e.g., expected start bars, stop bars and quiet zones). Alternatively, circuit 182 may determine data validity by comparing the data produced by a sequence of two or more scan lines.

Pre-raster motor control circuit 184 applies control signals to motor 154 to rotate (oscillate) mirror 152 at selectable angles and angular velocities (frequencies) to produce an appropriate raster scan pattern for light beam 48. Based upon the position signal applied to central control circuit 182 via conductor 192, circuit 182 applies motor control signals to motor control circuit 184 via conductors 196 and 198. As discussed in detail below, these control signals allow control circuit 184 to control the angle of rotation of mirror 152 and the speed or frequency at which the mirror is rotated between the angles. As discussed in further detail below, the motor control signals are also based upon the ability of control circuit 182 to convert the pulse train produced by decode circuit 186 into data representative of information which is valid.

A hall-effect transducer 51 may be included in assembly 16 to produce a position signal representative of the position of mirror 152. In particular, the signal from transducer 51 is converted to digital data representative of the minimum and maximum angles of rotation for mirror 152 by circuit 168. Based upon this data, circuit 168 maintains mirror 152 within predetermined minimum and maximum angles of rotation.

Auto focus control circuit 188 applies a control signal to stepping motor 68 via databus 176 to control light beam focusing by assembly 12. In response, assembly 12 moves lens 60 to produce a focused light beam 48. Based upon the ability of central control circuit 182 to convert the pulse train produced by decode circuit 186 into valid bar code data, circuit 182 applies control signals to auto focus control circuit 188 via databus 189 to control assembly 12 to optimally focus beam 48.

Figures 12A, 12B:
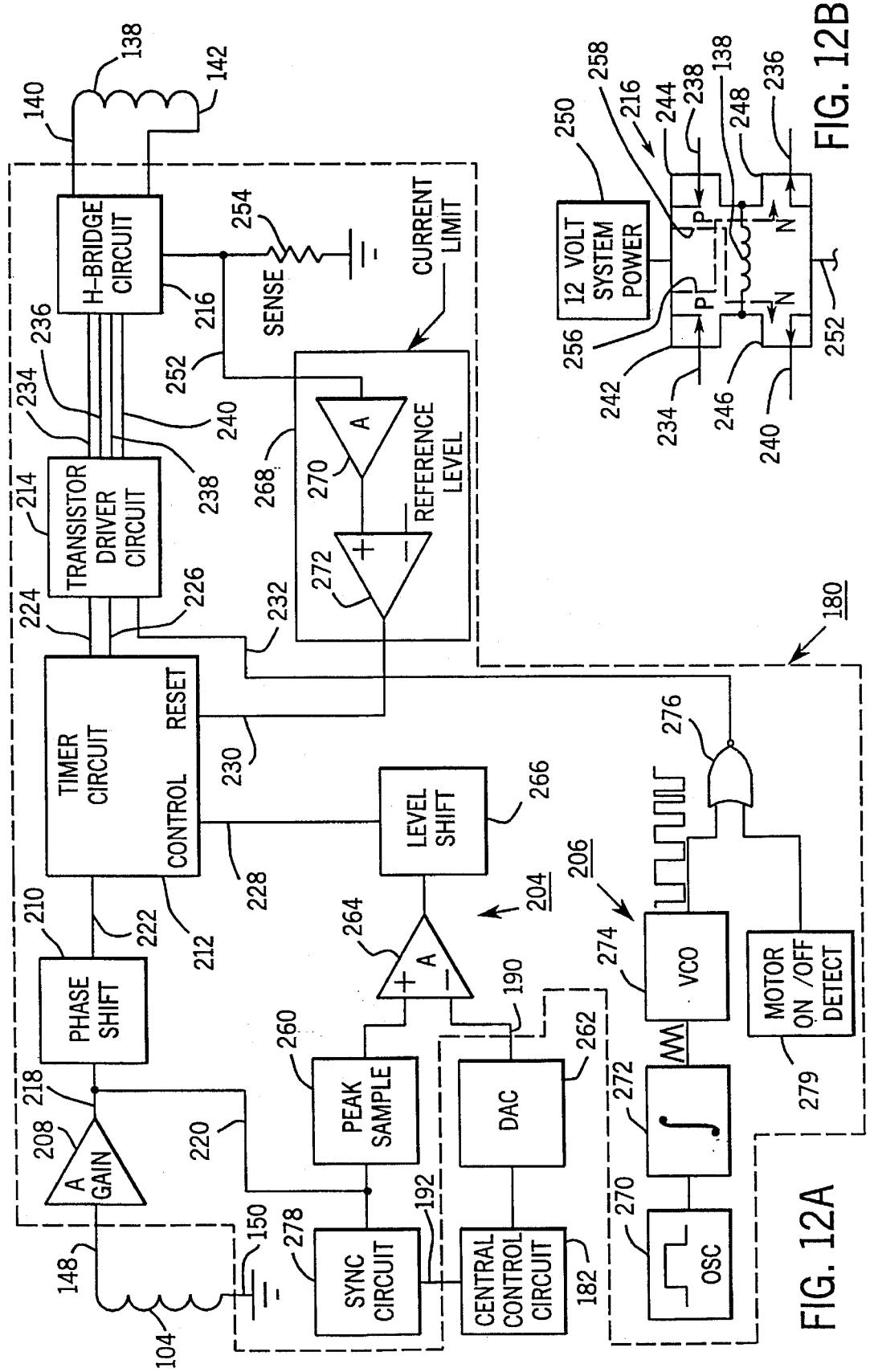
FIG. 12A is a schematic diagram of the oscillator drive circuit of the control and decode circuit.
FIG. 12B is a circuit diagram for the H-bridge circuit of the oscillator drive circuit.

Turning to FIGS. 12A and 12B, oscillation drive circuit 180 generally includes a steady state oscillation drive circuit 204, and a starting circuit 206. Drive circuit 204 includes an amplifier 208, a phase shifting circuit 210, a timing circuit 212, a transistor driver circuit 214, and an H-bridge circuit 216. The signal produced by magnetic pickup 104 is a periodic position signal representative of the location of mirror 96, and is applied to amplifier 208 by conductor 148. Amplifier 208 amplifies the periodic signal to a level suitable for monitoring by the circuitry coupled to the output of amplifier 208 and applies the amplified signal to conductors 218 and 220.

Phase shifting circuit 210 shifts the phase of the periodic signal by a predetermined angle and applies the phase-shifted signal to conductor 222. Phase shifting is performed to produce magnetic forces between the electromagnet of assembly 98 and permanent magnet 116 at or near the positions during the oscillating cycle of mirror 96 which optimize oscillation performance. By way of example only, the phase shift would be in the range of 30° when winding 138 is energized to oscillate mirror 96 at frequencies between 150–250 Hz, and is set at 0° when winding 138 is energized to oscillate mirror 96 at frequencies in the range of 400 Hz.

Timer circuit 212 is connected to conductor 222, and produces a pair of pulse-width signals which are applied to conductors 224 and 226. The widths (durations) of the pulse-width signals are controlled by the signals applied to a control input 228 and a reset input 230 of circuit 212. More specifically, the voltage on the control input is varied within a range to select the pulse width of the signals applied to conductors 224 and 226. By way of example, this voltage signal may be in the range of 0.5–4.5 V. The pulse width of the signals applied to conductors 224 and 226 may also be controlled by applying either a HIGH or LOW logic signal to reset input 230. More specifically, when reset input 230 is driven to logic LOW, the signals output to conductors 224 and 226 have zero pulse width (i.e., no signal). When the logic level applied to reset input 230 is HIGH, the pulse width of the signals applied to conductors 224 and 226 is controlled by the voltage level applied to control input 228.

Timer circuit 212 outputs two pulse-width modulated signals on conductors 224 and 226 having a frequency substantially the same as the frequency of the signal applied to conductor 222. These signals control transistor driver circuit 214 to control H-bridge circuit 216 which energizes winding 138 with a ramp current. More specifically, conductor 224 transmits a pulse-width signal which corresponds to energizing winding 138 with a current in a first direction, and conductor 226 transmits a pulse-width signal which corresponds to energizing winding 138 with a current in a second direction opposite to the first direction. Transistor driver circuit 214 is controlled by the signals on conductor 224 and 226 so the opposite N and P transistors in H-bridge circuit 216 are turned completely ON or completely OFF for the proper periods of time. This operation of circuit 214 energizes winding 138 so mirror 96 is oscillated at the appropriate frequency and angle of oscillation.

Transistor driver circuit 214 is coupled to conductors 224 and 226, and also a conductor 232. Based upon the pulse-width signal on conductor 224, transistor driver circuit 214 produces transistor switching signals on conductors 234 and 236. Based upon the pulse-width signals on either conductor 226 or 232, transistor driver circuit 214 produces transistor switching signals on conductors 238 and 240. Transistor driver circuit 214 is configured to convert the 0–5 V logic signals on conductors 224, 226 and 232 into first and second signals, with the first signal having an amplitude of 0 V when the second signal has 12 V (i.e. system power supply voltage), and with the second signal having an amplitude of 0 V when the first signal has 12 V. By way of example, the following Table A illustrates the statuses of conductors 224, 226 and 232 and the associated statuses of conductors 234, 236, 238 and 240.

TABLE A

|  | Conductor 226 or 232 Status | |
| --- | --- | --- |
|  | 0 Volts (V) | 5 Volts (V) |
| Conductor 224 | 5V | 0V |
| Conductor 234 | 12V | 0V |
| Conductor 236 | 0V | 12V |
| Conductor 238 | 0V | 12V |
| Conductor 240 | 12V | 0V |

To produce the 0 V and 12 V signals, transistor driver circuit 214 utilizes appropriate signal conditioning and inversion circuits. As illustrated in Table A, the status of conductors 224 and 226 are controlled so that these conductors do not have the same statuses, since this situation may damage H-bridge circuit 216 as discussed below.

In general, H-bridge circuit 216 applies a ramp current at the full voltage of the system power supply (e.g. 12 V) at a polarity and for a duration dependent upon the pulse-width signals applied to conductors 224 and 226. More specifically, referring to FIG. 12B, H-bridge circuit 216 includes two low resistance semiconductor switches (e.g. P-channel field effect transistors 242 and 244), and two low resistance semi-conductor switches (e.g. N-channel field effect transistors 246 and 248). The gates of transistors 242, 244, 246 and 248 are connected to conductors 234, 238, 240 and 236, respectively. The sources of transistors 242 and 244 are connected to the 12 V system power supply 250, and the sources of transistors 236 and 240 are connected to ground by a conductor 252 and a current sensing resistor 254 (FIG. 12A). The drains of transistors 242 and 246 are connected together at one side of the winding 138 and the drains of transistors 244 and 248 are connected together at the other side of winding 138.

Referring again to Table A, when the signal on either conductor 226 or 232 is 0 V, transistors 244 and 246 are non-conducting (OFF), transistors 242 and 248 are fully conducting (ON) and a linearly increasing current at the full power supply voltage of 12 V is flowing through winding 138 along the direction marked with arrow 256 for a duration equal to the duration of the 5 V pulse on conductor 224. Similarly, when the voltage on either conductors 226 or 232 is at 5 V, transistors 242 and 248 are non-conducting, and transistors 244 and 246 are fully conducting. Thus, the linearly increasing current at the full power supply voltage of 12 V flows in the direction marked by arrow 258 through winding 138. This configuration of H-bridge circuit 216 reduces power losses and heat generation in oscillating drive circuit 180 by controlling the energy applied to winding 138 during oscillation using the full system voltage for a variable pulse duration, rather than using a fixed pulse duration at a variable voltage controlled by transistors.

As briefly discussed in reference to timer circuit 212, this circuit is configured to synchronize the switching of the transistors in H-bridge 216 to prevent damage thereto. More specifically, timer circuit 212 can be configured to include TLC556 dual CMOS timers sold by Texas Instruments. One of the timers in the TLC556 produces the pulse-width signal on conductor 224 and the second timer produces the pulse-width signal on conductor 226. The timers are synchronized and configured to include RC delay circuits therebetween to assure that transistors 242 and 248 are not ON at the same time transistors 244 and 246 are ON.

Steady state oscillating circuit 204 also includes feedback circuitry including a peak sample circuit 260, an amplifier 264, and a level shifting circuit 266. The input to the peak sampling circuit 260 is connected to conductor 220 and configured to produce a DC voltage representative of the actual angle through which mirror 96 is oscillating. The output of circuit 260 is applied to the inverting input of amplifier 264. When the circuitry of FIG. 12A is calibrated during manufacturing, a digital value representative of the desired angle of oscillation for mirror 96 is stored in non-volatile memory (flash memory) of circuit 182. Digital data representative of this digital value is applied to digital-to-analog converter 262, which outputs a corresponding DC voltage representative of the desired angle of oscillation for mirror 96 to the non-inverting input of amplifier 264. (Digital-to-analog converter 262 can be part of circuit 180 or control circuit 182. By way of modification, digital-to-analog converter 262 and the corresponding connection to circuit 182 could be eliminated by replacing digital-to-analog converter 262 with a potentiometer.)

The difference between the voltages applied to the inputs of amplifier 264 are amplified and applied to level shifting circuit 266. Circuit 266 adds an offset voltage (e.g. 1.5 V) to the difference, and adjusts the range of the voltage difference to fall within 0.5–4.5 V. The purpose of this level shifting is to produce a duration control signal on control input 228 which is compatible with the circuitry of timer circuit 212. In operation, when the voltages applied to amplifier 264 are substantially equal, a minimum width pulse is applied to conductors 224 and 226 which has the minimum width required to energize winding 138 to maintain the oscillation of mirror 96. When the voltages applied to amplifier 264 are different, the actual oscillation angle has a deviation from the desired oscillation angle. In response, a duration control signal is applied to control input 228 so the pulse width of the signals applied to conductors 224 and 226 are increased in relation (e.g. proportion) to the difference between the actual and desired oscillation angles. By controlling the pulse width of these signals, winding 138 is driven with an energy level sufficient to oscillate mirror 96 (increase or decrease the angle of oscillation) toward the desired angle of oscillation.

Oscillation drive circuit 180 also includes a current limiting circuit 268 which includes an amplifier 270 and comparator 272. The input to amplifier 270 is connected to conductor 252 and is amplified to produce an output signal applied to the non-inverting input of comparator 272. The inverting input of comparator 272 is connected to a reference voltage (e.g., 1 V). Accordingly, when the current flowing through winding 138 produces a voltage across sensing resistor 254 which corresponds to an output voltage at the output of amplifier 270 greater than 1 V, comparator 272 drives the reset input 230 to logic LOW. As discussed above, logic LOW at reset input 230 limits the maximum pulse width of the signals applied to conductors 224 and 226. The purpose of current limiting circuit 268 is to prevent damage to H-bridge 216 and winding 138 as a result of applying excess power to winding 138. Typically, circuit 268 is inoperative; however, in situations such as oscillation start-up, conditions may cause the duration of the signals on conductors 224 and 226 to remain unacceptably high for an extended period of time.

Starting circuit 206 includes an oscillator 270, an integrator 272, a voltage control oscillator 274, an inverting OR gate 276, and a motor motion detection circuit 279. The output of oscillator 270 is connected to the input of integrator 272 to produce a triangle wave which controls the output frequency of voltage control oscillator 274. Voltage control oscillator 274 is configured to have a center frequency at the resonant frequency of the associated pre-raster mirror assembly 16 (e.g., 150, 250, 400 Hz) and outputs a square wave which is dithered about the center frequency and applied to one input of gate 276. The dithering is produced by the triangle wave applied to oscillator 274. The triangle wave is based upon the frequency of oscillator 270 (e.g., 1 Hz).

The output of the motor status detection circuit 279 is applied to the other input of gate 276. Circuit 279 is configured to drive the second input of gate 276 HIGH when it detects that a signal is being produced by magnetic pickup 204. Circuit 279 can be configured using various circuitry, and may sense the signal produced by pickup 104 based upon sensing the output of amplifier 208 or the output of phase shifting circuit 210. In operation, circuit 206 applies a variable frequency, variable pulse-width signal to conductor 232 which causes transistor driver circuit 214 to output signals on conductors 238 and 240. These signals control H-bridge circuit 216 to energize winding 138 in a single direction. This "half-wave" energization is sufficient to initiate oscillatory motion of mirror 96 about the selected resonant frequency. Upon detection of a signal at pickup 104, the signal applied to conductor 232 by circuit 206 terminates.

Circuit 180 also includes a synchronization circuit 278 which is configured to produce a square wave having the same frequency as the signal produced by magnetic pickup 104. This square wave is applied to central control circuit 182 via conductor 192 and is utilized by circuit 182 to synchronize the operation of reader 10 based upon the position of mirror 96 as sensed by magnetic pickup 104.

Figure 13:
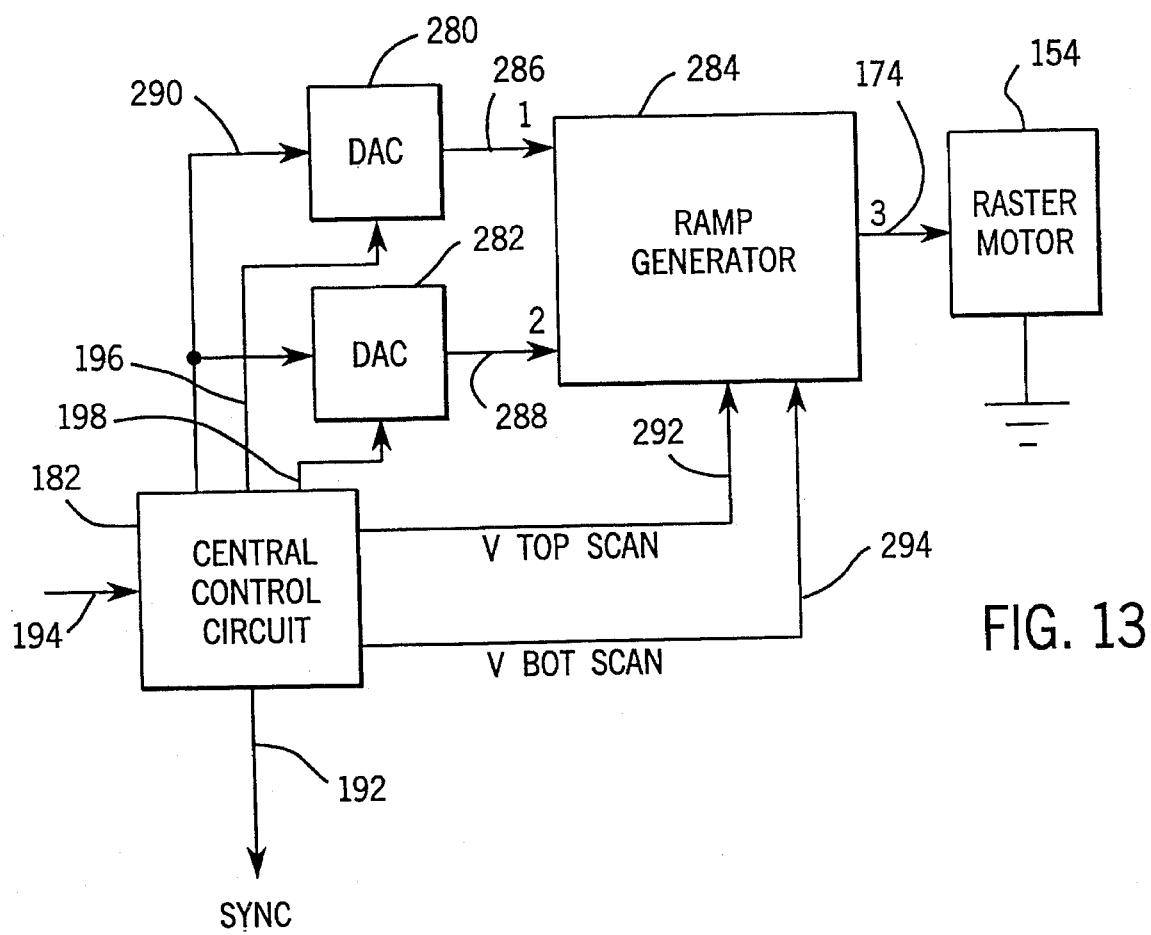
FIG. 13 is a schematic block diagram of the pre-raster motor control circuit of the control and decode circuit.

Referring to FIG. 13, pre-raster motor control circuit 184 includes digital-to-analog converters 280 and 282, and a ramp generator 284. The analog outputs of converters 280 and 282 are coupled to voltage inputs 286 and 288 of ramp generator 284. The voltage on conductor 174 is generated by ramp generator 284, as discussed in detail below, based upon the voltages applied to inputs 286 and 288. The angle of rotation of raster motor 154 is related to (proportional to) the voltage applied to raster motor 154 via conductor 174. The voltage generated by converters 280 and 282 is based upon a digital signal (e.g. 6-bit) applied to converters 280 and 282 by central control circuit 182 via databuses 196 and 198, respectively. (A databus 290 connects circuit 182 to converters 280 and 282 for the purpose of providing appropriate clocking pulses to the converters.) In addition to applying control voltages to generator 284 at voltage inputs 286 and 288, central control circuit 182 also applies a top scan signal and a bottom scan signal to generator 284 via data lines 292 and 294.

Figure 14B:
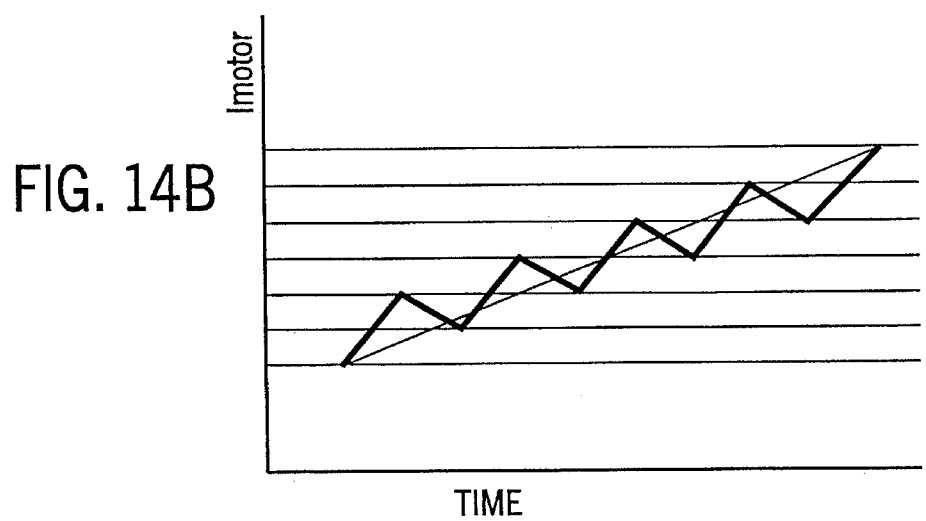
FIG. 14B is a graph of the pre-raster current curve for producing the pattern shown in FIG. 14A.

In general, central control circuit 182 and converters 280 and 282 apply control voltages to voltage inputs 286 and 288 which vary the angle (slope) of the scan lines of the raster pattern produced by reader 10. More specifically, FIG. 14A illustrates a scan pattern having the scan lines 296 which are scanned from left to right at an angle 298, and scan lines 300 which are scanned from right to left at an angle 302 which is less than angle 298. To produce the type of scanning pattern illustrated in FIG. 14A, the voltage applied to raster motor 154 via conductor 174 is varied so that the current ($I_{motor}$) applied to motor 154 varies with time substantially as shown in FIG. 14B. By varying the voltage on line 174, and thus varying the slope of the motor current relative to time for each scan line, the angles 298 and 302 of the scan lines can be varied.

In operation, central control circuit 182 monitors the ability to convert the pulse train produced by decode circuit 186 into valid data, and varies the control voltages at inputs 286 and 288, which control ramp generator 284 to vary the slope of the motor current applied to motor 154. This control of motor 154 permits varying angles 298 and 302 until the angle (slope) of the scan lines is adjusted to read bar codes having bars which are not substantially perpendicular to horizontal scan lines. This arrangement permits reader 10 to read bar codes, such as multi-row bar codes which are particularly difficult to read, using a fixed station bar code reader.

Figure 15:
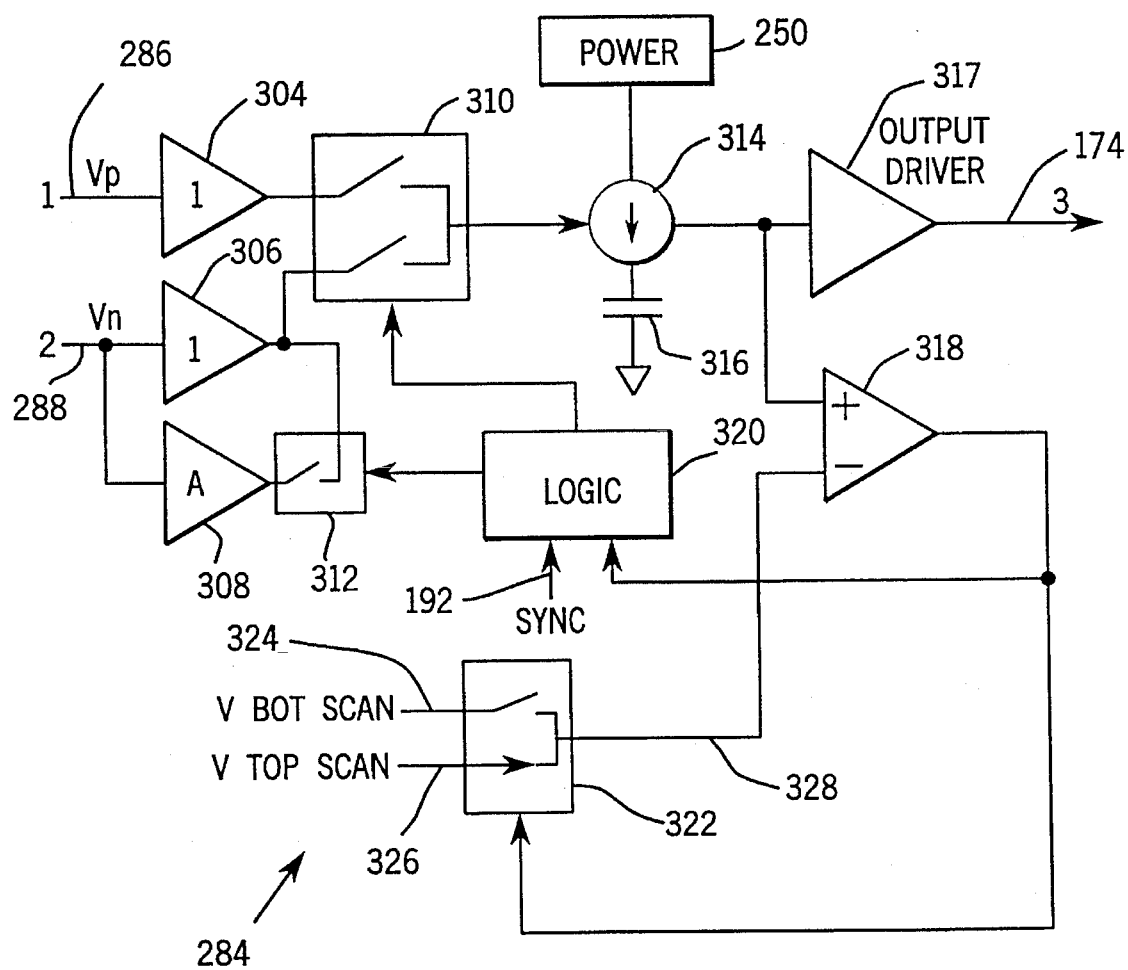
FIG. 15 is a schematic diagram of the ramp generator of the pre-raster motor control circuit.

Referring to FIG. 15, the presently preferred embodiment of ramp generator 284 includes a buffer 304, a buffer 306, an amplifier 308, a double pole logic switch 310, a single pole logic switch 312, a current source 314, a capacitor 316, an output driver 317, a comparator 318, a logic circuit 320, and a switching circuit 322. This circuitry is coupled together as illustrated in FIG. 15, where voltage input 286 is connected to the input of buffer 304 and voltage input 288 is connected to the input of buffer 306 and amplifier 308. Raster motor 154 is connected to the output of driver circuit 317. Circuit 318 produces the appropriate current to drive raster motor 154 at the voltage of current source 314 and could be implemented using the appropriate operational amplifiers.

Switch logic 310 may be a dual SPST type FET switch or equivalent and operates to switch either the voltage supplied to voltage input 286 or the voltage applied to voltage input 288 to the constant current source 314. In response, capacitor 316 charges at a rate representative of the difference between the voltages applied to inputs 286 and 288. The voltage across capacitor 316 defines the voltage applied to motor 154, which in turn defines the angle of motor 154.

Amplifier 308 and switch 312 are provided to produce a relatively large negative voltage which is applied to current source 314 when logic circuit 320 determines that the top of the scanned area (FIG. 14A) has been reached, and the end of the top scan line has also been reached. In response, logic circuit 320 closes switch 312 and switch 310 such that the voltage at input 288 is amplified substantially above the voltage at input 286. In response, high negative angle voltage is produced and applied to motor 154 to decrease the angle of motor 154 and return light beam 48 from the top right portion of the raster scan pattern back to the bottom left of the pattern (i.e. beginning of the pattern) within 1 or 2 sweeps of beam 48. Thus, mirror 152 is rotated at a higher angular velocity to return the light beam to the bottom left than the rotational velocity used to rotate mirror 152 while moving the light beam from the bottom to the top of the scan area.

Logic circuit 320 controls switch 310 based upon a SYNC signal at conductor 192 which is produced by SYNC circuit 278 (FIG. 12A). Based upon the SYNC signal, logic circuit 320 controls switch 310 to apply the voltages at inputs 286 or 288 to current source 314 when mirror 96 changes directions during rotation about the axis of shaft 106. This permits control of angles 298 and 302 and the angular velocity for each half-cycle of oscillation for mirror 152 (i.e. each scan line).

Central control circuit 182 applies a voltage to input 324 of switch 322 representative of the voltage corresponding to the top of the raster scan pattern, and applies a voltage to input 326 of switch 322 which is representative of the voltage corresponding to the bottom of the raster scan pattern. Switch 322 toggles its output 328 between the voltages at inputs 324 and 326 in response to the output of comparator 318. In particular, when a voltage is being applied to raster motor 154 which causes the raster scan to progress upwardly to the top of the pattern, the output of current source 314 is compared to the voltage at input 326. When the output of current source 314 exceeds the voltage applied to input 326, comparator 318 causes switch 322 to connect the voltage at input 324 to the output 328. Additionally, logic circuit 320 switches switch 312 so a control signal is applied to motor 154 which causes mirror 152 to rotate (reduce the mirror angle) such that the light beam "flies back" to the beginning of the scan pattern, as discussed above. While raster motor 154 is rotating mirror 152 to return the light beam to the beginning of the scan pattern, comparator 318 compares the output voltage of current source 314 to the voltage applied to input 324. When the voltage output by current source 314 goes below the voltage applied to input 324, comparator 318 causes switch 322 to apply the voltage at input 326 to line 328, and causes logic circuit 320 to open switch 312 and control the switching of switch 310 to progress the raster pattern upwardly with scan lines having angles which are determined by the voltages applied to inputs 286 and 288 generated by central control circuit 182, as discussed above. Angles 298 and 302 are varied from half-cycle to half-cycle by varying the rotational speed of motor 154 between half cycles based upon the voltage output on conductor 174.

Turning back to FIG. 11, auto focus control circuit 188 may be a conventional stepping motor control circuit coupled to central control circuit 182 by databus 189 (FIG. 12). As discussed above, control circuit 182 monitors the validity of the data representative of the square wave produced by decode circuit 186. In operation, a user of reader 10 can automatically adjust the focus of beam 48 by placing a bar code at the desired reading distance while control circuit 182 is operated to apply signals to control circuit 188 which cause stepping motor 68 to translate lens 60 until control circuit 182 is able to generate valid data from the pulse train produced by decode circuit 186. Subsequently, control circuit 182 continues to apply control signals to control circuit 188 to continue operating stepping motor 68 to move lens 60 until control circuit 182 is unable to obtain valid data from the pulse train produced by decode circuit 186. Control circuit 182 then determines the range of steps through which valid data is obtained from the square wave produced by decode circuit 186, and applies a control signal to control circuit 188 which causes stepping motor 68 to move lens 60 at or near the midpoint of the range. This system for moving lens 60 positions lens 60 such that the focus of light beam 48 is optimized. This system also eliminates the need to include proximity sensors in bar code reader 10 for the purpose of controlling the operation of stepping motor 68 to move lens 60 such that light beam 48 is properly focused for accurate bar code reading.

While particular embodiments of the present invention have been shown and described, it should be clear that changes and modifications may be made to such embodiments without departing from the time scope and spirit of the invention. For example, substantially all of steady state oscillating circuit 204, starting circuit 206 and ramp generator 284 could be provided by substituting the respective circuitry with programmed digital processors, or by replacing circuit 182 with an appropriately programmed and larger digital processor than suggested for the present embodiment of circuit 182. Furthermore, reader 10 typically includes a single cover (not shown) attached to support structure 18 which protects the components of reader 10 and provides a window for the scanning light. However, depending upon the application, it may be useful to use a particular cover shape or group of covers. It is intended that the appended claims cover all such changes and modifications and others not specifically mentioned herein.

What is claimed is:

1. An optical code reader for reading a code located at a distance from the reader, the reader comprising:

a light source configured to produce a light beam;

a lens;

a lens support assembly configured to movably support the lens in the path of the light beam and move the lens in response to movement control signals to produce a focused light beam;

a scanner configured to cyclically scan the focused light beam over the surface of a code;

a photodetector configured to produce electrical signals representative of a portion of the focused light beam reflected from the code;

a decoding circuit coupled to the photodetector, the decoding circuit being configured to convert the electrical signals into digital data, determine the presence of invalid data in the digital data, and produce an error signal in the presence of invalid data; and a control circuit coupled to the lens support assembly and the decoding circuit, the control circuit applying movement control signals to the assembly based upon the error signal.

2. The reader of claim 1, wherein the decoding circuit compares the digital data converted from electrical signals representative of the light reflected from the code for a first scan cycle to the electrical signals representative of the light reflected from the code for a second scan cycle, and produces the error signal from such comparison.

3. The reader of claim 1, wherein the control circuit is configured to produce movement control signals which control the assembly to move the lens along the path and toward the light source until the amount of invalid data increases beyond a predetermined limit.

4. The reader of claim 3, wherein the control circuit is configured to produce movement control signals which control the assembly to move the lens along the path and away from the light source until the amount of invalid data increases beyond the predetermined limit.

5. The reader of claim 1, wherein, upon commencement of an error signal, the control circuit produces movement control signals which control the assembly to move the lens along the path in a first direction relative to the light source to a first location at which the amount of invalid data increases beyond a predetermined limit, produces movement control signals which control the assembly to move the lens along the path in a second direction opposite the first direction to a second location until the amount of invalid data increases beyond the predetermined limit, and produces movement control signals to control the assembly to move the lens along the path to a location intermediate the first and second locations.

6. The reader of claim 1, wherein the decoding circuit and control circuit are embodied in a programmed microprocessor.

7. The reader of claim 1, wherein the scanner is configured to scan the focused light beam over a two-dimension area of the code.

8. An optical code reader for reading a code located at a distance from the reader, the reader comprising:

a light source configured to produce a light beam;

a focusing lens;

a lens support assembly configured to guide the lens in and along the path of the light beam;

an electric motor operatively coupled to the lens support to move the lens along the path in response to movement control signals to produce a focused light beam;

a photodetector configured to produce electrical signals representative of the light reflected thereon;

a pair of oscillating mirrors located in the path to cyclically scan the focused light beam over a two-dimension area within which the code may reside, and direct a portion of the focused light beam reflected from the code to the photodetector;

a decoding circuit coupled to the photodetector, the decoding circuit being configured to convert the electrical signals into digital data, determine the presence of data errors in the digital data, and produce an error signal in the presence of data errors; and a control circuit coupled to the electric motor and the decoding circuit, the control circuit applying movement control signals to the electric motor based upon the error signal.

9. The reader of claim 8, further comprising a cam connected to the electric motor by a gear train and a cam surface fabricated in the lens support, the cam, gear train and cam surface operatively coupling the electric motor to the lens support.

10. The reader of claim 8, wherein one of the pair of oscillating mirrors includes a flat reflective surface and a concave reflective surface.

11. The reader of claim 8, wherein the decoding circuit compares the digital data converted from electrical signals representative of the light reflected from the code for a first scan cycle to the electrical signals representative of the light reflected from the code for a second scan cycle, and produces the error signal from such comparison.

12. The reader of claim 8, wherein the control circuit is configured to produce movement control signals which control the electric motor to move the lens along the path and toward to the light source until the number of data errors increases beyond a predetermined limit.

13. The reader of claim 12, wherein the control circuit is configured to produce movement control signals which control the electric motor to move the lens along the path and away from the light source until the number of data errors increases beyond the predetermined limit.

14. The reader of claim 8, wherein, upon occurrence of an error signal, the control circuit produces movement control signals which control the electric motor to move the lens along the path in a first direction relative to the light source to a first location at which the number of data errors increases beyond a predetermined limit, produces movement control signals which control the electric motor to move the lens along the path in a second direction opposite the first direction to a second location at which the number of data errors increases beyond the predetermined limit, and produces movement control signals which control the electric motor to move the lens along the path to a location intermediate the first and second locations.

15. The reader of claim 8, wherein the decoding circuit and control circuit are embodied in a programmed microprocessor.

16. An optical code reader for reading a code, the reader comprising:

light means for producing a light beam;

focusing means for focusing the light beam;

movement means for movably supporting the focusing means in the path of the light beam and moving the focusing means in response to movement control signals to produce a focused light beam;

means for cyclically scanning the focused light beam over the surface of a code;

means for producing electrical signals representative of a portion of the focused light beam reflected from the code;

means for converting the electrical signals into digital data, determining the presence of data errors in the digital data, and applying movement control signals to the movement means based upon the number of data errors.

17. The reader of claim 16, wherein the means for converting compares the digital data converted from electrical signals representative of the light reflected from the code for a first scan cycle to the electrical signals representative of the light reflected from the code for a second scan cycle, and determines the number of data errors from such comparison.

18. The reader of claim 16, wherein the means for converting produces movement control signals which control the movement means to move the focusing means along the path and toward the light means until the number of data errors increases beyond a predetermined limit.

19. The reader of claim 18, wherein the means for converting produces movement control signals which control the movement means to move the focusing means along the path and away from the light means until the number of data errors increases beyond the predetermined limit.

20. The reader of claim 16, wherein, upon initiation of data errors, the means for converting produces movement control signals which control the movement means to move the focusing means along the path in a first direction relative to the light means to a first location at which the number of data errors increases beyond a predetermined limit, produces movement control signals which control the movement means to move the focusing means along the path in a second direction opposite from the first direction to a second location at which the number of data errors increases beyond the predetermined limit, and produces movement control signals to control the movement means to move the focusing means along the path to a location intermediate the first and second locations.

* * * * *